(12) United States Patent
Habraken

(10) Patent No.: US 8,689,013 B2
(45) Date of Patent: Apr. 1, 2014

(54) DUAL-INTERFACE KEY MANAGEMENT

(76) Inventor: G. Wouter Habraken, Austin, TX (US)

( * ) Notice: Subject to any disclaimer, the term of this patent is extended or adjusted under 35 U.S.C. 154(b) by 236 days.

(21) Appl. No.: 12/908,332

(22) Filed: Oct. 20, 2010

(65) Prior Publication Data

US 2011/0035604 A1 Feb. 10, 2011

Related U.S. Application Data

(63) Continuation-in-part of application No. PCT/US2009/061567, filed on Oct. 21, 2009, which is a continuation-in-part of application No. 12/255,438, filed on Oct. 21, 2008, now Pat. No. 8,070,061.

(60) Provisional application No. 61/107,232, filed on Oct. 21, 2008.

(51) Int. Cl.
*G06F 11/30* (2006.01)
*G06F 12/14* (2006.01)

(52) U.S. Cl.
USPC .............................. 713/193; 726/26

(58) Field of Classification Search
USPC .................. 713/193–194; 726/26–30, 2–3; 365/185.01; 711/163–164
See application file for complete search history.

(56) References Cited

U.S. PATENT DOCUMENTS

| | | | |
|---|---|---|---|
| 5,120,939 A | 6/1992 | Claus et al. | |
| 5,420,924 A | 5/1995 | Berson et al. | |
| 5,434,919 A | 7/1995 | Chaum | |
| 6,434,238 B1 | 8/2002 | Chaum et al. | |
| 6,718,314 B2 | 4/2004 | Chaum et al. | |
| 7,158,783 B2 * | 1/2007 | Eguchi | 455/420 |
| 7,844,831 B2 * | 11/2010 | Benhammou et al. | 713/189 |
| 2002/0008145 A1 | 1/2002 | Walsh et al. | |
| 2002/0062438 A1 | 5/2002 | Asay et al. | |
| 2005/0033703 A1 | 2/2005 | Holdsworth | |
| 2005/0120232 A1 * | 6/2005 | Hori et al. | 713/193 |
| 2005/0228988 A1 * | 10/2005 | Traw et al. | 713/158 |

(Continued)

FOREIGN PATENT DOCUMENTS

WO 2010/048350 A1 4/2010 ............... G07F 7/10

OTHER PUBLICATIONS

R. L. Rivest, A. Shamir, and L. Adleman, "A Method for Obtaining Digital Signatures and Public-Key Cryptosystems," *Communications of the ACM*, vol. 21, No. 2 (downloaded from http://people.csail.mit.edu/rivest/publications.html), pp. 120-126, Feb. 1978.

(Continued)

*Primary Examiner* — Eleni Shiferaw
*Assistant Examiner* — Jing Sims
(74) *Attorney, Agent, or Firm* — Campbell Stephenson LLP

(57) ABSTRACT

In one embodiment, a device includes a first interface, a second interface, a memory, and a processor coupled to the first and second interfaces and to the memory. The processor is configured to receive key-management information via the second interface, and to store the key-management information in a protected portion of the memory as stored key-management information. The processor is also configured to perform a challenge-response authentication interaction via the first interface. The challenge-response authentication interaction is based at least in part on the stored key-management information. The device is configured to prevent data in the protected portion of the memory from being modified in response to information received via the first interface.

35 Claims, 11 Drawing Sheets

(56) References Cited

U.S. PATENT DOCUMENTS

| | | | |
|---|---|---|---|
| 2006/0208066 A1* | 9/2006 | Finn et al. .................. | 235/380 |
| 2007/0015589 A1* | 1/2007 | Shimizu et al. ............... | 463/43 |
| 2007/0283415 A1* | 12/2007 | Kurita ........................... | 726/2 |
| 2008/0016354 A1* | 1/2008 | Wilding et al. ............... | 713/171 |
| 2008/0034440 A1* | 2/2008 | Holtzman et al. ............ | 726/27 |
| 2008/0148393 A1 | 6/2008 | Wendt | |
| 2010/0096452 A1 | 4/2010 | Habraken | |

OTHER PUBLICATIONS

Neuman, Clifford B., et al., "A Note on the Use of Timestamps as Nonces," *Operating Systems Review*, vol. 27, No. 2, pp. 10-14, Apr. 27, 1993.

Menezes, A., et al., "Chapter 12: Key Establishment Protocols," *Handbook of Applied Cryptography*, CRC Press, Boca Raton, FL, pp. 489-541, 1997.

Clark, John, et al., "A Survey of Authentication Protocol Literature: Version 1.0," pp. 1-109, Nov. 17, 1997.

Rankl, W., et al., "Handbuch der Chipkarten, 4.Auflage, Kap. 10.3, 10.4 Lebenszyklus einer Chipkarte," Handbuch Der Chipkarten, pp. 638-656, Aug. 29, 2002.

Steven M. Bellovin, "A Introduction to Modern Cryptography," presentation (downloaded from http://www.research.att.com/smb), pp. 1-31, Mar. 1, 2003.

Fan, Chun-I, et al., "Robust remote authentication scheme with smart cards," *Computers & Security*, vol. 24, pp. 619-628, 2005.

Gerhard P. Hancke, "A Practical Relay Attack on ISO 14443 Proximity Cards," manuscript (downloaded from http://www.cl.cam.ac.uk/~gh275/), pp. 1-13, Feb. 2005.

Ziroli Plutschow, "Security and Privacy Aspects of Low-Cost Radio Frequency Identification Systems," presentation (downloaded from http://www.crypto.ethz.ch/teaching/lectures/ISS05/), 75 pages, Dec. 12, 2005.

Joint Interpretation Library, "Application of Attack Potential to Smartcards," Version 2.1, pp. 1-34, Apr. 2006.

Eurosmart, "RFID technology security concerns: Understanding Secure Contactless device versus RFID tag," manuscript (downloaded Aug. 27, 2008 from http://www.eurosmart.com/Update/07-10/Eurosmart_White_paper_on_RFID_Oct07.pdf), pp. 1-9, 2007.

TechEncyclopedia, "Challenge/Response," web page downloaded Jul. 11, 2008 from http://www.techweb.com/encyclopedia/shared/ArticlePageSrc.jhtml?term=challenge/response, pp. 1-2.

Wikipedia, "CRAM-MD5," web page downloaded Jul. 11, 2008 from http://en.wikipedia.org/wiki/CRAM-MD5, pp. 1-2.

Wikipedia, "SHA hash functions," web page downloaded Jul. 11, 2008 from http://en.wikipedia.org/wiki/SHA_hash_functions, pp. 1-8.

International Search Report for International Patent Application No. PCT/US2009/061567, 5 pages, Apr. 9, 2010.

\* cited by examiner

DUAL-INTERFACE KEY MANAGEMENT

RELATED APPLICATIONS

This application is a continuation-in-part of copending International Application No. PCT/US2009/061567, titled "Card Credential Method and System," filed on Oct. 21, 2009, and naming G. Wouter Habraken as inventor, which claims the benefit of priority of U.S. Provisional Patent Application No. 61/107,232, titled "Dual-Interface Key Management," filed on Oct. 21, 2008, and naming G. Wouter Habraken as inventor, and U.S. patent application Ser. No. 12/255,438, titled "Card Credential Method and System," filed on Oct. 21, 2008, now U.S. Pat. No. 8,070,061, and naming G. Wouter Habraken as inventor; and is a continuation-in-part of the aforementioned copending U.S. patent application Ser. No. 12/255,438. The aforementioned applications are hereby incorporated by reference herein, in their entirety and for all purposes.

BACKGROUND OF THE INVENTION

1. Field of the Invention

The present invention relates to secure access techniques, and more particularly to authentication using physical devices, such as access cards, with two or more communication interfaces.

2. Description of the Related Art

There are currently several technologies used for contactless communications, including those defined by the International Organization for Standardization (ISO) in ISO 14443 "Identification cards—Contactless integrated circuit(s) cards—Proximity cards," as well as several technologies used with radio-frequency identification (RFID) tags. These technologies allow devices such as access cards, credit cards, passports, and product tags to communicate with specialized readers to provide information about associated people or products.

Various technologies, such as the MasterCard® Paypass™ system, assist users with paying for purchases using a contactless interaction. And many different types of RFID allow the tagging of products and pallets for the purpose of tracking their process through supply chains. Such contactless communication technologies are incorporated into various products. Contactless interfaces can also be used in secure authentication products, such as the Mifare® systems produced by NXP Semiconductors of Eindhoven, the Netherlands.

Because of their physical limitations, however, contactless interfaces have thus far found only limited use in secure authentication products. For example, the communication capacity ("bandwidth") and power required to perform high security authentication, such as a public-key cryptographic operation, is generally not available in unpowered contactless access cards.

SUMMARY

Described herein are tools and techniques for managing and using access cards that have two or more communications interfaces. In one embodiment, a method includes receiving key-management information onto an access card that has a first interface, a second interface, and a memory. The first interface is used during an interaction with a device, such as an electronic door lock or other access control device. Such interactions can use communications with a comparatively lower security level. The second interface is used for key management information. Such interactions can require communications with a comparatively higher security level. The key-management information includes a key that is to be used in making access requests through the first interface, such as requests by a user to enter a secure area, or requests to login to a secure computation server.

In various implementations, the access card is configured to prevent the memory from storing data that is based on information received through the first interface. The method can also include storing the key-management information in the memory, generating an access request based at least in part on the stored key-management information, and transmitting the access request through the access card's first interface.

In various implementations, the first interface is a contactless interface and the second interface is a contact interface. The method can additionally include receiving authentication requests from a provider of the key-management information. The authentication requests comprises data strings that are formatted to serve as challenges in a challenge-response authentication interaction. In various implementations of the method, the challenge-response data strings serve as vehicles for carrying the key-management information.

In one embodiment, a device includes a first interface, a second interface, a memory, and a processor. The processor is coupled to the first and second interfaces and to the memory. The processor is configured to receive key-management information through the second interface, and to store the key-management information in a protected portion of the memory. The processor is also configured to perform a challenge-response authentication interaction through the first interface. The challenge-response authentication interaction is based at least in part on the key-management information as stored in the protected portion of the memory. In various implementations, the processor includes hardware configured to prevent access from the first interface to the protected portion of the memory and/or to prevent any modification of data in the protected portion based on access through the first interface.

The device can be deployed as a physical-access card or other system, such as a mobile communications device that has two interfaces. In one example, the first interface is a near-field communication (NFC) interface and the second interface is a mobile telephony interface on the mobile communications device.

BRIEF DESCRIPTION OF THE DRAWINGS

A more complete understanding of the present invention and advantages thereof can be acquired by referring to the following description and the accompanying drawings, in which like reference numbers indicate like features.

DETAILED DESCRIPTION

Figure 1:
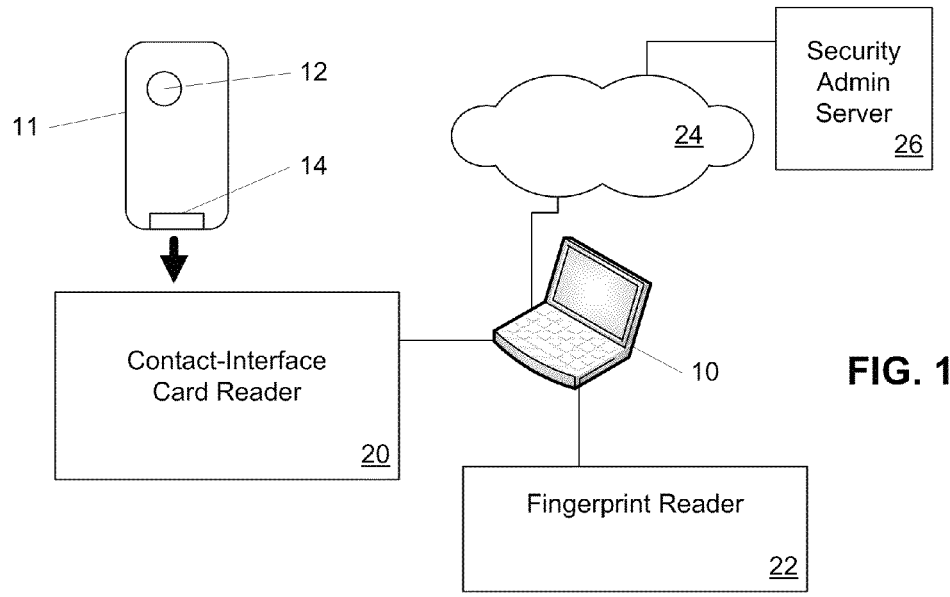
FIG. 1 illustrates an example of an environment in which an access card obtains an access key through a contact interface.

One challenge for designers of contactless devices, and the systems that use them, is to protect the devices from unauthorized reading or duplication. This protection is needed to ensure the security and/or privacy of information stored in the contactless devices. Another challenge arises in designing contactless devices that can communicate adequate amounts of information during a contactless interaction.

One issue is that the contactless nature of the device can severely limit the interaction time and processing cycles available for executing protective security processes. The security of contactless systems would be significantly enhanced if the lifetime of the keys or other sensitive information on the card were systematically limited to a time span that is much shorter than the usable lifetime of the contactless device. The cryptographic keys on the devices (and related readers) could then be changed for each project and revised regularly and frequently over the lifetime of the devices.

For a variety of technical and business reasons, however, existing systems typically fail to enforce such discipline. Setting or changing the keys on a contactless device, such as a contactless access card, generally requires a dedicated card "writer" using special programming keys. Because the ability to change the keys can be used for malicious purposes (e.g., a bad actor could use the writer to duplicate a valid card), vendors make it very difficult to obtain the required writer and or programming keys. As a result, contactless cards typically use only a single key to secure the card contents throughout the expected lifetime (or "lifecycle") of the card. Because the keys on contactless cards are hard to change, they are often shared across multiple buildings or even multiple campuses. This means that when a card is hacked, or a key is exposed, the results are often a systemic failure of a project's security.

A method and system are presented for managing the keys on a dual- (or multi-) interface device. One embodiment employs a "smart" card that has both a contactless interface and a contact interface coupled to an internal processor. The contactless interface can be an interface conforming to ISO 14443, noted above, for example. The contact interface can be an interface conforming to ISO 7816 "Identification Cards—Integrated Circuit Cards with Contacts."

Key management involves the functions relating to the key lifetime(s) of the device keys, the secure communication of the keys, and the management of the security properties related to the keys. Key management includes, for example, loading, refreshing, and generating keys; setting usage and access rules for a particular key (e.g., allowing that key to be used by one application, but not another); setting and changing personal identification numbers (PINs), user passwords, or userids, or similar information that is required to use the keys; setting the number of uses of a key before a particular event (such as key blocking) occurs; and unblocking PINs and keys.

A dual-interface device is a device that has two (or possibly more) interfaces for communicating with other devices, such as card readers. For example, the two interfaces can be physically distinct components, and/or can use different physical communications protocols. The two interfaces can, for example, have significantly different properties of available bandwidth, length of sessions, stability of the connection, and/or predictability of the connection. Each of the two interfaces can provide different advantages, uses, or features.

In one implementation, a dual-interface device is an access card that has both an ISO 14443 contactless interface and an ISO 7816 electronic-contact interface. Another example implementation is a portable digital assistant with both an ISO 7816 interface and a USB interface (both using electronic contacts).

Yet another example implementation is a card that has a single hardware connector, but uses two distinct data protocols. For example, such a single-connector dual-interface device could be achieved using a SmartMX® card that uses an ISO 14443 contactless interface to communicate both (a) with a Mifare reader (e.g., for opening doors, using a relatively fast but somewhat unpredictable transaction with low bandwidth) and (b) to a desktop station (e.g., through a PC desktop contactless card reader in which the card can reliably sit for relatively long periods of time, and with which the card can take advantage of smart card ISO 7816 application protocol data unit (APDU) communications, high bandwidth, and long predictable sessions).

Physical Access with a Dual-Interface Access Card

FIG. 1 illustrates an example of an environment that uses a dual-interface access card 11. A user of access card 11 can request access to secure services, such as a secure physical area protected by an access-card lock on a door. The access requests are made through a first interface, which in this example is a contactless interface 12. Contactless interface 12 is used to perform a quick wireless interaction with a card reader, as discussed below. The interaction is based on one or more temporary access keys stored in access card 11.

Access card 11 obtains the access key through a second interface, which in this case is a contact interface 14. The access key is typically a short-lifetime access key, which is recognized as valid only for a limited time. The contact interface enables an embedded processor within access card 11 to communicate with other devices such as a portable computer 10. This communication is carried through a portable contact-interface card reader 20 into which the access card can be inserted. Card reader 20 can be connected to portable computer 10 through an interface such as universal serial bus (USB) interface. Alternatively, a card reader can be directly installed in portable computer 10.

In this environment, access card 11 can obtain the access key from a remotely located security administration server 26. Administration server 26 communicates with portable computer 10 though a network 24 such as the Internet or other data network. This communication can be secured, for example, using secure socket layer (SSL) encryption. Portable computer 10 then loads the access key onto the access card through the card reader.

Before transmitting the access key, the administration server can require the user of the portable computer to verify that he or she is an appropriate user, for example by entering a userid and password. Alternatively, or in addition, the administration server can require the entry of some biometric data, such as a through a portable fingerprint reader 22 connected to portable computer 10.

Before transmitting the access key, the administration server can also require the access card to verify that the access card is an appropriate access card. This verification can be performed, for example, using an authentication procedure based on a long-lifetime key that is embedded in the access card. This embedded long-lifetime key is, in general, unrelated to the short-lifetime access key that access card 11 is attempting to obtain from the administration server 26.

In one implementation, the long-lifetime key is part of a public-private key pair that can be used in a public key infrastructure (PKI). The key pair can be generated and stored by the embedded processor within access card 11 when the access card is initially activated and registered by a card manufacturer, or by a card administration service. At that time, the public key of the key pair can be read out from the access card and provided to relevant organizations, such as the owner of administration server 26. The private key of the key pair remains securely locked within access card 11. For example, the private key can be stored in a protected portion of memory in access card 11. Typically, this long-lifetime key pair is used throughout the expected lifetime of access card 11.

In the scenario illustrated in FIG. 1, administration server 26 can use the public key for access card 11 to pose a challenge to the access card. For example, administration server 26 can generate and encrypt a random message with the public key of access card 11. Administration server 26 then transmits the encrypted random message as a challenge to access card 11. The access card receives this message through contact interface 14.

Contact interface 14 provides a relatively large communication capacity for access card 11. Additionally, contact interface 14 supplies power to the embedded processor in access card 11. Using this power supply and the available communication capacity, access card 11 decrypts the challenge to recover the original random message that was generated by administration server 26. By transmitting the original random message (or a hash thereof) back to administration server 26, access card 11 demonstrates that it is in possession of the private-key counterpart of the public key used by the administration server. To the extent that administration server 26 has confidence in the PKI distribution and protection of the public-private key pairs, the administration server can have confidence that it is in communication with a legitimate access card 11.

The interactions that are used to obtain this confidence are carried through contact interface 14. In general, communications through the other interface—contactless interface 12—may not have the bandwidth, capacity, power, duration, reliability, or stability to support these interactions.

After the user has been verified through the appropriate user-authentication procedure, and after the access card has been verified through the appropriate card-authentication procedure, administration server 26 can transmit the access key to access card 11. In this example, the access key is communicated from administration server 26 via network 24, portable computer 10, and card reader 20 to access card 11.

Figure 2:
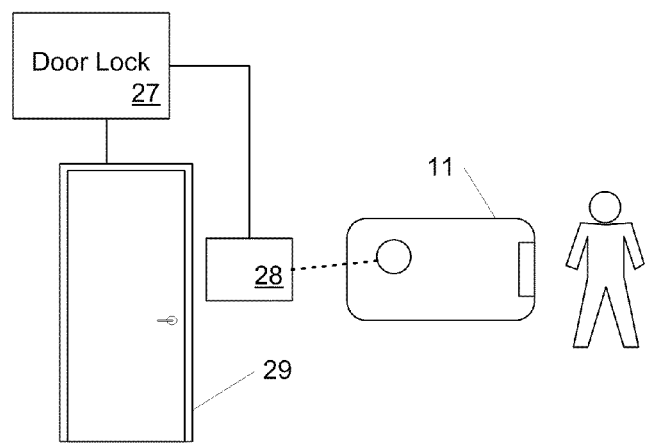
FIG. 2 illustrates an example of an environment in which the access card from FIG. 1 uses the access key for a transaction through a contactless interface.

FIG. 2 illustrates an example of an environment in which access card 11 from FIG. 1 uses an access key for a transaction through contactless interface 12. In this example, an access key has already been loaded into access card 11 (e.g., using the techniques described above with regard to FIG. 1). The access key allows a user of the access card to enter a secure area behind a door 29. To open the door, the user presents access card 11 to a contactless card reader 28. Card reader 28 interacts with contactless interface 12 using non-contact communication. For example, card reader 28 and contactless interface 12 can be configured to use a 13.56 MHz wireless link with the ISO/IEC 14443 standard. During this interaction, access card 11 uses the access key stored therein to respond to a challenge posed by card reader 28.

Using its internal processor, access card 11 can respond in real time to a challenge received from card reader 28. The card reader typically uses random numbers to generate challenges that are unique: the challenges include data that are different from one access attempt to another. Access card 11 performs a calculation using the internally stored access key and the data received from the card reader. Based on that calculation, access card 11 transmits a response back to card reader 28. Card reader 28 examines the response to confirm that access card 11 possesses the correct access key. Access is granted only if access card 11 has returned an acceptable response to the challenge sent by the card reader. This challenge-response interaction protects the access key on access card 11: the key itself is not transmitted as part of the communications between the access card and the card reader.

By adequately responding to the challenge from card reader 28, access card 11 authenticates itself to card reader 28. Card reader 28 then opens a door lock 27 on door 29. The user is thus permitted to enter the secure area protected by door 29.

The interactions discussed above illustrate various features of the dual interfaces on access card 11. Contactless interface 12 enables quick and easy access by a user, who may merely wave the access card in front of a card reader to open a door. This ease of access is not available using contact interface 14, which generally requires a stable mechanical contact to communicate. However, contactless interface 12 can suffer from low-bandwidth and low-power issues, especially if access card 11 does not have an on-board battery. Thus, as discussed above, contactless interface 12 is generally not able to support high-security transactions, such as PKI authentication.

Moreover, contactless interfaces can be relatively vulnerable to eavesdropping attacks when they are in use. In addition, contactless interfaces can be vulnerable to spoofing attacks, in which a malicious user surreptitiously attempts to interrogate the contactless interface. Similarly, a malicious user may attempt to disable an access card by loading a false access key into the access card through the contactless interface. In anticipation of such attacks, some contactless cards are configured to disable themselves if they detect malicious activity (such as repeated failed attempts to communicate through the contactless interface). Unfortunately, this defense leads to another type of attack: a malicious user can use this defense mechanism to potentially disable the access card by presenting the access card with attack-like communication attempts.

To protect against such attacks, access card 11 can be configured to merely ignore any communications that are deemed to be attack attempts through the contactless interface. In addition, access card 11 can be configured so that the embedded key pair and other high-security information are not readable or otherwise accessible through the contactless interface. Thus, this sensitive information is protected from attacks through the contactless interface. Interactions relating to this long-lifetime sensitive information can be made only through the less-vulnerable contact interface 14.

At most, therefore, the access key that is used for opening door 29 may be vulnerable to simple attacks through contactless interface 12. This possible vulnerability can be ameliorated by configuring the access key with a relatively short lifetime, such as a few hours or a few days. Devices that respond to the access key, such as contactless card reader 28, can be configured to ignore the access key if it has not been recently updated (e.g., replaced with a more current access key). The access key can thus be configured as a relatively short-lifetime key that needs to be updated relatively often.

In selecting the lifetime of the access key, a system administrator may generally consider (a) the sensitivity of the access that it provides, and (b) the inconvenience of updating the access key. If a high-sensitivity area is being protected by the access key, that weighs toward requiring a more frequent update of the access key. This frequency should be weighed against the cost of requiring users to frequently repeat the update procedures. Based on these and other factors, an administrator may elect to deploy access keys with short lifetimes of, for example, one minute, 15 minutes, 1 hour, 2 hours, 18 hours, 1 day, a few days, 1 week, a few weeks, 1 month, a few months, 1 year, or a few years.

A user can update the access key on access card 11 by, for example, inserting access card 11 into contact-interface card reader 20. Access card 11 can then be updated with a new key after undergoing the higher-security measures discussed above with regard to FIG. 1.

These higher-security measures are enabled by card reader 20, which supplies power and comparatively high-bandwidth communications to access card 11. As discussed above, these interactions can utilize higher-security features of access card 11, such as an embedded PKI key pair, which is assigned a comparatively long lifetime. In various implementations, access card 11 can be configured so that these higher security features are available only through contact interface 14, thereby protecting these long-lifetime features from attacks through contactless interface 12. (Conversely, in certain implementations, access card 11 can be configured such that interactions that use the access key are available only through contactless interface 12.)

Figure 3:
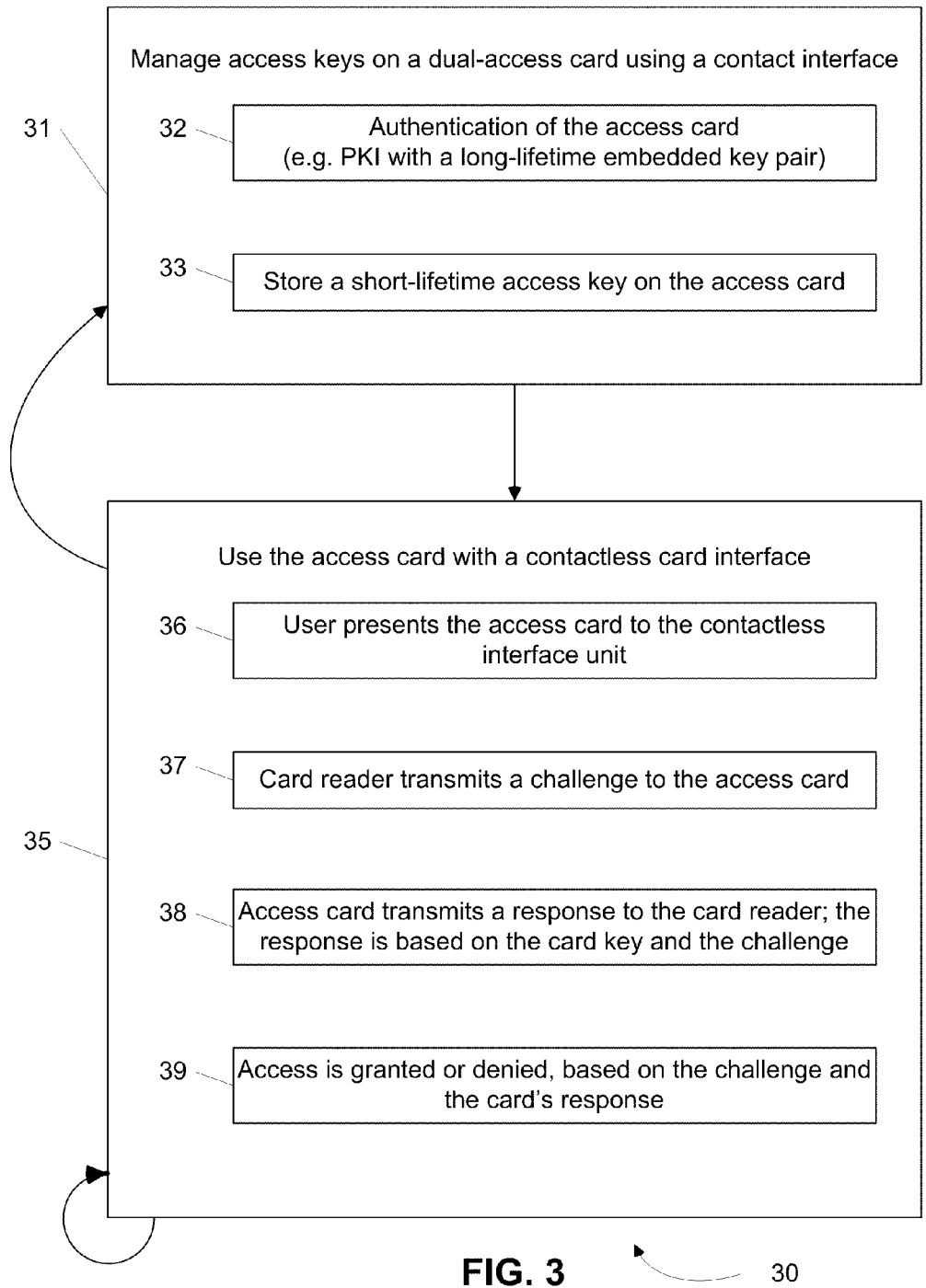
FIG. 3 is a flowchart of a process for managing and using keys with a dual-interface access card.

FIG. 3 is a flowchart of a process 30 for managing and using access keys with a dual-interface access card. In this example, process 30 includes two sets of operations. In block 31, an access card is loaded with a short-lifetime access key through a contact-interface card reader (e.g., card reader 20). Block 31 includes acts 32 and 33, which can be used, for example, for the operations discussed above with relation to FIG. 1. The access card is then used with a different card reader (e.g., card reader 28) to gain access to a secure facility in block 35. Block 35 includes acts 36, 37, 38, and 39, which can be used, for example, for the operations discussed above with relation to FIG. 2.

After being loaded with a short-lifetime access key in block 31, the access card can be used to gain access to a protected area, or other secure facility. This access can be repeated during the lifetime of the access key, as indicated by a looping arrow for block 35. From time to time (e.g., occasionally or on a set schedule), the access key can be updated, either voluntarily or as required by a security protocol. This updating is indicated by a looping arrow in FIG. 3 that returns from block 35 to block 31.

Block 31 begins with act 32, in which the access card is authenticated. The authentication can use, for example, a challenge-response PKI protocol such as described above. In conjunction with the authentication of the access card, a user of the access card may also be authenticated, for example by a password or biometric measurement. In act 33 a short-lifetime access key is stored on the access card through the contact interface. Additional key-management information can also be stored on the access card in conjunction with the keys.

The access card can then be used in block 35 to gain access to a secure facility using a contactless card reader. (In various implementations, access can also be granted to other facilities by using a contact-interface card reader).

The card reader used in block 35 is generally deployed at a different location from the card reader used in block 31. For example, the contact card reader used in block 31 can be mounted at a security checkpoint attended by security personnel at the entrance to a building. In contrast, the contactless card readers used in block 35 can be mounted outside doors to various protected areas in other parts of the building, or in other buildings. This arrangement requires users to undergo security procedures at the building entrance before they can enter the various protected areas. In this arrangement, the security procedures and personnel used to perform block 31 at the building entrance do not need to be duplicated at each of the various protected areas. Instead, the user can execute the comparatively faster and/or less expensive operations of block 35 immediately before entering one of the protected areas.

Block 35 begins with act 36, in which a user holds the access card near a card reader, or otherwise presents the access card to the card reader. In one implementation, the card reader continuously broadcasts an RF signal. The access card detects the signal when it is within close range (a few inches to a few feet) of the card reader, and transmits an RF response to inform the card reader of the presence of the access card. In act 37, the card reader transmits a challenge to the access card. In act 38, the access card returns a response to the card reader. The response is based on the challenge and on the access key that was stored on the access card in act 33. In act 39, the communications between the card reader and access card are evaluated to decide whether the user should be granted access to the secure facility.

Once the keys are put in place using the second interface of an access card (block 31), the first interface on the same card can be used for interactions that employ those keys (block 35). For example, a Mifare application can authenticate the card by using the short-lifetime keys loaded into the card. The operations in block 35 can use a first interface (e.g., an ISO 14443 contactless interface) on a dual-interface device to carry out operations that rely on short-lifetime keys or other information stored on the device for use in a quick interaction. The operations in block 31 can use a second interface (e.g. an ISO 7816 electronic-contact interface) for the management of the short-lifetime keys that are used by the first interface, or management of applications that use the first interface. The second interface can be used to update and otherwise manage keys that are used by the first interface, and also to support applications that use the first interface.

In general, the dual-interface access cards are configured so that key management can be performed only through the second (contact) interface, and is not allowed through the first (contactless) interface. In some implementations, however, a dual-interface access card may enable some limited key management operations through the first interface. Such implementations may, for example, allow the access card to receive a supplemental administration key through the first interface, while disabling access to longer-lifetime PKI features through the first interface.

Logical Access with a Dual-Interface Access Card.

As discussed above, various implementations of the second interface of a dual-interface device provide functionality that is different from the first interface. In the foregoing examples, the first interface of a dual-interface device is a contactless interface and the second interface is a contact interface. The device is used to provide physical access by a user into a secure facility. The techniques described above can also be used in implementations with two interfaces that are both contact interfaces, or that are both contactless interfaces. In some implementations, the first and second interface both communicate through a single physical connector, but use two different communications protocols for communicating with different applications. Dual-interface devices can also be used to provide types of access other than physical access by the user.

In one example, a dual-interface access card has a contactless interface and a contact interface. The contactless interface is used for obtaining physical access to secure areas. The contact interface is used to gain "logical" access to one or more protected computers (or protected data collections). As opposed to the physical access environments discussed above, the logical access situations do not involve a user's physical entry into a protected area. Instead, the logical access may be, for example, a remote login that enables a user to run a command-line shell on a protected computer that may be at a different location from the user. Similarly, the logical access may be a login through a web browser, or other interface, that allows the user to read and view information in a protected data directory. Logical access may also be a login to a computer that is at the user's location, but which requires user authentication that is obtained from a remote server.

In this example, the contact interface is used for logins that are based on a long-term key (or credential) stored in the access card, and which use a comparatively higher-security communications protocol. In conjunction with supporting the logins, the contact interface also serves as a second interface, for communications with a key server that provides a short-term key to the access card. Communication with the key server requires the execution of a cryptographic function (such as a 2048 bit RSA authentication) for remote authentication by the key server. Alternatively, or in addition, this authentication may require the user to provide a PIN (or other pass code) and/or a fingerprint (or other biometric authentication). Upon a successful authentication using the contact interface, the key server transmits the short-term key to the access card through the contact interface. The short-term key then enables the user to obtain physical access to protected areas, through the contactless interface.

Automated Updates, Mixed Logical/Physical Access and Other Variations.

In various implementations, a successful communication through the second interface on a dual-interface device can be used to trigger a key-management event for a key that is used by the first interface on the dual-interface device. For example, a successful communication through the second interface can initiate an automatic update of one or more short-term keys that are used with one or more "first" interfaces.

For example, a dual-interface access card can be configured so that it is authenticated when it successfully makes a logical connection to an organization's key server through a contact interface. This logical connection through the contact interface may require, for example, relatively higher-security measures and keys, such as embedded PKI keys and associated protocols (a "second" interface through which the card obtains short-term keys). After the authentication, the key server can automatically update or otherwise change the short-term keys or security policies that are stored on the access card.

In addition, the automatic update through the second interface may also enable a user to gain subsequent physical access (e.g., access for the user through the organization's security doors). The automatic update can provide the dual-interface device with short term keys to be used in challenge-response interactions between various card readers and the device's contactless interface (a "first" interface that uses the short-term keys obtained via the second interface). Similarly, the update may revoke or limit future rights of physical access or logical access.

A variety of security features can be achieved in various embodiments of a dual-interface device. The above examples enable a secure binding of one type of authentication (e.g., certificate-based authentication for logical access through a contact interface) with another (e.g., key-based authentication for physical access through a contactless interface). Further, in various implementations of a dual-interface device, the security-relevant communications through the second interface may be used to affect the policies for applications that use the first interface. In addition, some implementations of a dual-interface device can use the second interface to secure communication channels that can supply information to be used by applications on the device that subsequently operate using the first interface.

A variety of other applications and implementations are contemplated for key management systems using dual-interface devices according to the present invention. The skilled person will appreciate a number of possible variations, benefits, and configurations from the following examples of application scenarios.

Example Scenario 1

Physical Access Partially Dependent on Logical Access

In a first illustrative scenario, dual-interface access card 11 from FIGS. 1 and 2 is used by an employee of an organization. When the employee is at is at her desk in her office, she performs an authentication by logging in to her computer (e.g., portable computer 10) and a security system in the organization confirms her location (e.g., through the use of IP address mapping, device MAC mapping, and/or 802.1X authentication chaining). Then, using contact interface 14, the security system updates a set of short-lifetime access keys the on the employee's access card 11.

The short-lifetime access keys are available to applications on the access card that use contactless interface 12. These applications work with a physical-access authentication system for the organization. In this example, the updated keys have a relatively short lifetime of only 48 hours. When the user returns to her office building the next day, she presents access card 11 to a card reader (e.g., card reader 28) next to a door at the building entrance of the organization. The physical-access authentication system interacts with the card reader through contactless interface 12, and uses the updated short-lifetime keys to confirm that the user is a person who had recently performed an authentication. If the user should lose her card, the updated keys expire within 48 hours—that is, the physical-access authentication system will not honor them after that period.

In various implementations, the physical-access authentication system can update the short-lifetime keys and can also apply new security policies, for example by increasing a "remaining number of uses" counter stored in the system. This counter forces the user to undergo some form of re-authentication when the counter reaches zero.

An extensible authentication protocol (EAP) authentication method, as defined in RFC 3748, can also be used with a dual-interface device. For example, such a protocol can be used to integrate user authentication, through the second interface of the dual-interface device, with the provision of keys for physical access. The provided keys can then support physical access through the first interface. One benefit of such an implementation can be that it enables the access system to remotely refresh keys or policies. This implementation also obviates the need for users to update their cards at a particular physical location. Another possible benefit is that such a process flushes out cards that are lost, stolen, or otherwise not used for a period of time.

Example Scenario 2

Access Partitions; Physical Access with Biometric Authentication

In a second illustrative scenario, the same user visits a branch office of her organization—where she has not been before. She tries to enter the building by presenting access card 11 to a contactless reader next to the entrance. This fails because the user is not yet approved with keys for this branch office. The branch office recognizes the organization-wide access card system, but also has a branch-specific authentication protocol. This access card system is thus partitioned so that multiple short-term keys are required for access to corresponding sets of protected resources.

The user then uses her card to login at a kiosk (which uses a contact interface such as contact interface 14) in the branch office entrance hall, and provides her fingerprint to a fingerprint reader at the kiosk. The security system determines that the user is valid, based on the fingerprint. The user is then is approved for entry (for example, by credentials encoded in a digital certificate on her card, or through a back channel operation). The system loads appropriate short-lifetime keys (and/or credentials), specific to this branch office, onto access card 11 through the contact interface in the kiosk. The user once again presents her card to the contactless door reader. This time access card 11 is recognized and the door is opened, allowing the user to enter the branch office building. The user can repeatedly leave and return to the branch office without having to again provide her fingerprint at the kiosk for the lifetime of the new keys loaded onto her access card (e.g., 7 hours).

Example Scenario 3

Revoked Physical and Logical Access Partially Dependent on Violated Security Conditions In a third illustrative scenario, the same user is now at the branch office, but at a location in which she does not have approved access (for example a computer server room). The user plugs her laptop computer (e.g., portable computer 10) into the server room's local area network and attempts to login to the network. This login is a security violation since it is initiated under disallowed circumstances: the user had inappropriately entered the server room.

The network access system therefore rejects the login attempt—thwarting the user's request for a logical access. At the same time, the network access system voids access card 11 by revising key-management information stored on access card 11. For example, the network access system may change the security policies for contactless interface 12, which is used for the user's physical access in the organization. The change in security policies may be recorded on the access card itself, or in a central database of the network access system, or both.

Later, the user presents her access card to a card reader at another locked room in the organization. This attempt at physical is also an unauthorized access, since it is also initiated under disallowed circumstances (her access card was previously voided). Entry is refused, and a security guard for the branch office is alerted.

Example Scenario 4

Dual-Interface Mobile Communications Device

Figure 4:
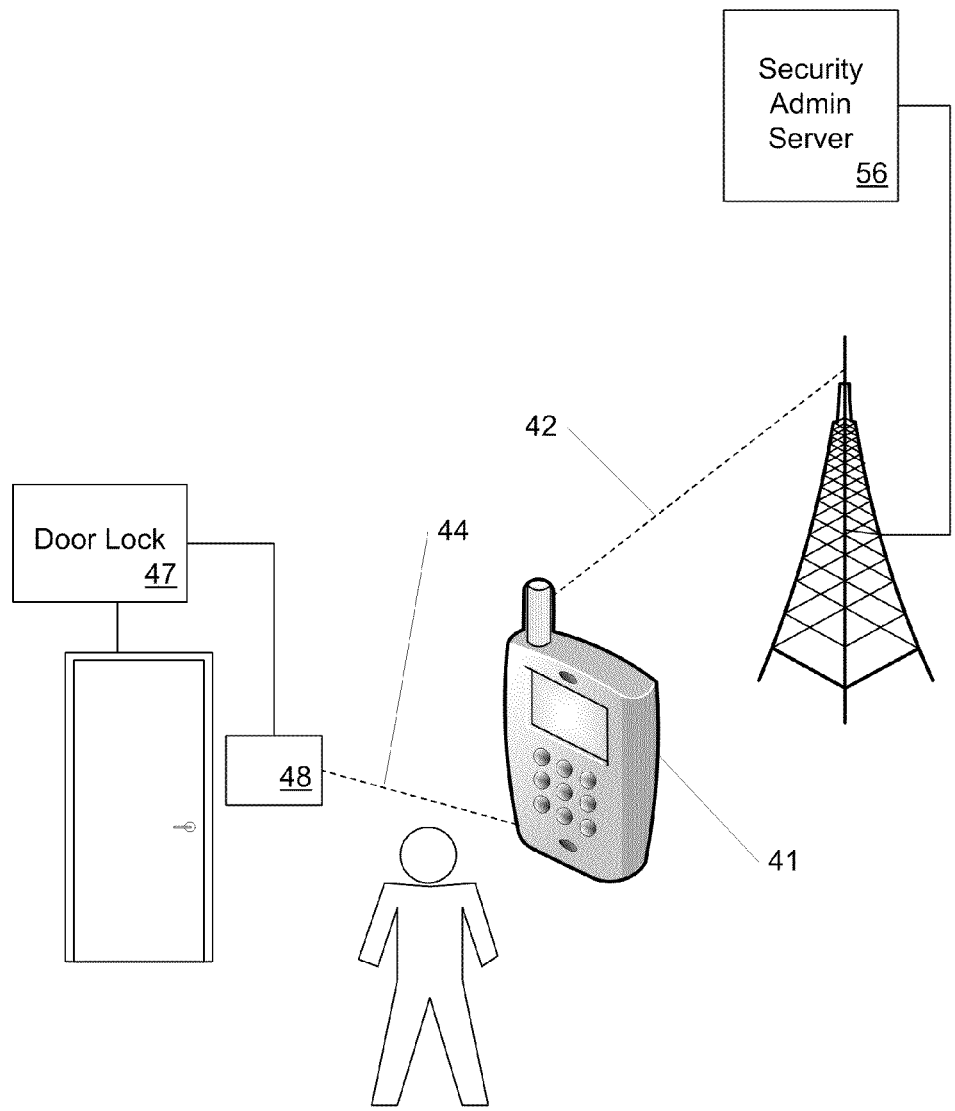
FIG. 4 illustrates an example of an environment in which a device with two communications interfaces manages and uses key-management information

FIG. 4 illustrates an example of an environment in which a device 41 with two communications interfaces manages and uses key-management information. In this example, the device is a cell phone that has one radio transceiver in a cellular telephone interface, and also has another radio transceiver in a near-field communication (NFC) interface. The cellular telephone interface is used to obtain keys and other key-management information from a security administration server 56 through a cellular link 42. The NFC interface is used to communicate with a contactless card reader 48 through a short-range radio link 44. Card reader 48 uses the obtained keys to open a door lock 47 through contactless card reader 48. Thus, device 41 is a dual-interface device with two contactless interfaces: both the first interface (NFC interface) and the second interface (cellular telephone interface) are wireless interfaces.

A fourth illustrative scenario uses the communication links shown in FIG. 4. There is a fire at an office building in the middle of the night. A first responder arrives at the building. He uses his mobile telephone (e.g., device 41 from FIG. 4) to call an emergency-access number displayed at the entrance of the building. A security department at the mobile-phone service provider responds to the call and uses the service provider's caller authentication procedures to confirm that the caller is indeed a first responder. For example, the security department may use caller-ID information, or interaction with a subscriber identity module (SIM), or equipment serial numbers, or a user password or personal identification number (PIN) to authenticate the caller.

The security department then sends access keys from the security department's server using a short message service (SMS) over cellular link 42 to the first responder's mobile telephone. The access keys are received by an application on the first responder's mobile telephone through SMS software. The first responder then presents his telephone's NFC interface to a physical access reader at the building entrance's door. The NFC interface communicates the received access keys to door lock 47, and the door opens.

In other implementations, instead of being sent by an SMS message, the keys can be communicated using another data channel or by a voice channel over cellular link 42. Other communications protocols can also be used for communicating between the mobile telephone and the physical access reader. For example, a Bluetooth or 802.11 communications link can be used between these two devices.

In the above example, the first responder's mobile telephone enables a binding of two domains: the authentication between the mobile telephone and the physical access reader is bound with the authentication between the mobile telephone and the security department. That is, the physical access reader effectively understands the first responder to have been authenticated by the procedures used by the security department, despite a lack of direct back-channel communication between the physical access reader and the security department.

Contact Interfaces and Contactless Interfaces.

In various implementations, contact interfaces provide communication through mechanical contacts between portable devices and device readers. Similarly, contactless interfaces provide communications through wireless communication elements (e.g., antennas, capacitive coupling elements, inductive coils, other inductive coupling elements, or combinations thereof) in portable devices and device readers. In various scenarios, contact interfaces are interfaces that primarily use current signals (electrons) for inter-device communications while contactless are interfaces that primarily use electromagnetic wave signals (photons) for inter-device communications.

In some implementations, a contact interface can connect a portable device to an off-card power source, while a contactless interface can not. In other implementations, a contact interface can more readily connect a portable device to an off-card power source than can a contactless device. These considerations are usable for designers of dual-interface devices. For example, a designer may elect to configure a contact interface for interactions that require relative lengthy interaction and/or power-intensive calculations by the portable device, such as key management or public-key cryptography. Conversely, a designer may elect to configure a contactless interface for interactions that need only brief interactions and/or low-power calculations by the portable device, such as symmetric-key authentication.

Example

Secure-Session Conduit Between an Access Card and a Remote System

Various security protocols include the transmission of a key over a network to a smart card. For example, the above discussion of FIG. 1 includes a transmission of a key from administration server 26 to access card 11 via a network and a card reader 20. (Similarly, FIG. 5, discussed below, shows an example in which a card credential is communicated from trusted server 130, through a data network and card reader 120, to access card 110.) A computing device, such as portable computer 10, is used to:

(1) communicate with the remote server and receive a transmission that includes the key, (2) parse the transmission to obtain the key, and (3) initiate a communication with access card 11 and pass the key on to access card 11.

Appropriate software for these operations can be installed on portable computer 10. Operations (1) and (3) can be performed through various forms of standard communications software running on portable computer 10. For example, network interface drivers and web browsers on portable computer 10 can be used to support communication with administration server 26. Similarly, a card-reader driver and interface software can enable portable computer 10 to communicate with card reader 20.

Operation (2), however, can require customized software to decrypt and parse the data received from administration server 26. In one implementation, a specialized application is installed on portable computer 10. The specialized application communicates with administration server 26 through the network interface driver on portable computer 10. Similarly, the specialized application communicates with card reader 20 through the card-reader driver. The specialized application is configured to communicate with corresponding modules on administration server 26, obtain the key from those communications, and pass the key to access card 11.

Generating such a specialized application poses a challenge to system designers. This challenge can be exacerbated in environments where the application needs to be deployed in a number of versions, e.g., for different operating systems that can be used by different types of portable computers and other computing devices. The challenge of generating the specialized application for operation (2) is accompanied by a second challenge: deploying the specialized application. A large number of users may need to install the specialized application on their respective portable computers. The installation and maintenance of the specialized application can impose an ongoing overhead for support staff. And yet a third challenge arises: the protection of the specialized application and its communications from eavesdropping by malicious programs that may surreptitiously be running on portable computer 10.

These three challenges can be addressed by the following design approach. Instead of terminating all of the communication from administration server 26 on portable computer 10, at least some of the communication from administration server 26 is terminated on access card 11. That is, portable computer 10 does not parse and process all of the payload communications from administration server 26. Instead, some of the data received from administration server 26 is simply passed along by portable computer 10 to access card 11. Similarly, some of the data received from access card 11 is simply passed along by portable computer 10 to administration server 26.

Portable computer 10 thus creates and supports a conduit for communications between administration server 26 and access card 11. This conduit passes through network 24, portable computer 10, and card reader 20. Such a conduit can be established without specialized software.

In various implementations, this conduit can be established using relatively standard web-browser software and a card-reader driver running on the portable computer. For example, the web-browser software on portable computer 10 can receive an applet from administration server 26. This applet is executed by the web browser to receive a data stream from administration server 26 and pass it to access card 11 through the card-reader driver. The applet also sends a return data stream, received from access card 11 through the card-reader driver, back to administration server 26.

Such configurations simplify the first challenge, of generating specialized software for supporting the communication between access card 11 and administration server 26. The applet is made available on a web site on administration server 26 for downloading and execution by a client web browser on portable computer 10. Thus, no specialized applications need to be manually installed on portable computer 10. This configuration also simplifies the second challenge, of deploying and supporting the specialized software. The applet can be configured such that it is readily deployed by standardized web browsers such as Internet Explorer®, for example.

Access card 11 establishes a secure channel with administration server 26. For example, access card 11 and administration server 26 can use a key-negotiation protocol to establish a session key for the secure channel. (This protocol is, in general, processor-intensive. Thus, access card 11 may generally draw power from card reader 20 through contact interface 14 during these operations.) The secure channel can then be used to protect from eavesdropping, including eavesdropping by malicious applications that may be running on portable computer 10. The secure channel therefore also addresses the third challenge, of securing the information transmitted to and from access card 11.

Example

Combined Secure-Session Initiation and Key Transmission

Building on the previous example, a secure channel between access card 11 and administration server 26 can simplify the transmission of key-management information to the access card. To start, the payload information—keys and other key-management information—does not need to be parsed and recognized by any intermediate devices (such as portable computer 10 or card reader 20). And, as described above in the discussion of FIG. 1, the secure channel is generally initiated with a transmission of a random message, such as a string of challenge data, from the administration server to the access card.

The transmission of challenge data can be part of a challenge-response PKI protocol. For example, such challenge data can be transmitted from administration server 26 in an attempt to establish a secure socket layer (SSL) link. The challenge data are passed through portable computer 10 to access card 11. Access card 11 receives the challenge data and uses an internal private key to generate a response to the challenge. Access card 11 then returns the response to administration server 26, thereby confirming that the access card is bona fide. This challenge-response operation can be repeated multiple times during operation of the secure channel, each with a different version of the challenge string.

In one implementation of this interaction, administration server 26 does not use purely random data to generate the initial challenge string. Instead, administration server 26 includes an encrypted version of the short-term access keys, or other key-management information, in a challenge string. Thus, the key-management information can be hidden within one or more of the seemingly random challenge strings. In addition, by placing this useful information—access keys and/or other key-management information—within the challenge string, the administration server simplifies the operations that need to be performed by the access card (and possibly by the applet running on the portable computer). This simplification arises because once the payload-laden challenge string (or strings) is received by access card 11, the secure channel can be terminated.

In various implementations, the key-management information is included in the first challenge string transmitted to the access card. In other implementations, the key-management information may be included in the challenge strings only after the access card has been authenticated.

Dual-Interface Card Credential Authentication

As described above, a dual-interface access card can be used in a variety of environments. The following discussion introduces a credential and associated procedures that can be used with a dual-interface card. In various embodiments, this credential and associated procedures can provide secure authentication via a contact interface, while supplying convenient physical access using a contactless interface. The credential and associated procedures can also be used with dual-contactless interface cards and dual-contact interface cards.

One of the concerns in access-card authorization systems is that a malicious party may be able to deduce the internal key in an access card, or otherwise "break" the cryptographic features in the calculations performed by the access card, and thereby learn how to provide correct responses to challenges from card readers. One approach to avoiding such attacks is to increase the sophistication of the challenge-response calculations performed by the access card. Such an approach generally imposes some additional cost or complexity, such as an increased processing power for the access card. System designers, therefore, generally make trade-offs between simplicity and cryptographic security. The following discussion and the accompanying FIGS. 5-12 present approaches in which a credential stored on an access card enhances security by binding one type of authentication (a strong PKI authentication using a contact interface) with another (a short-term key-based authentication for physical access using a contactless interface).

Figure 5:
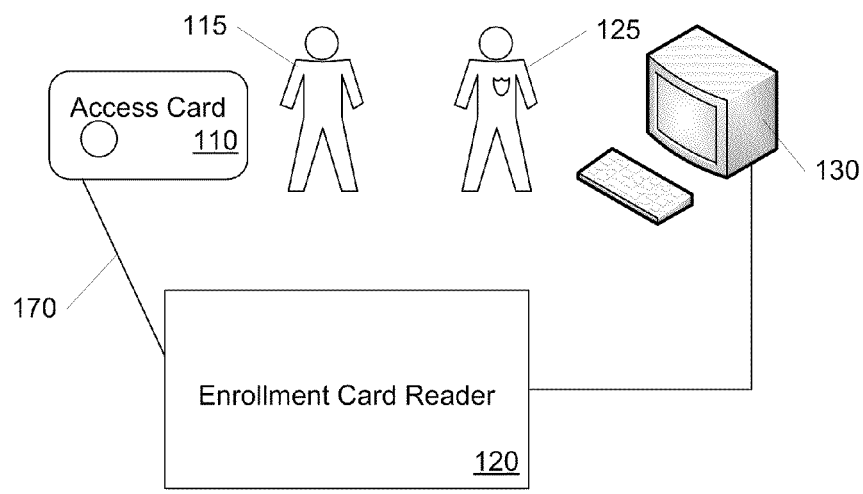
FIG. 5 illustrates an example of an environment in which a user enrolls an access card.

FIG. 5 shows an example of an environment in which a user 115 enrolls an access card 110. An "out-of-band" authentication process is employed to establish that user 115 is a legitimate user, authorized to gain access to an organization's secure area. This out-of-band authentication is some technique by which a gate-keeping administrator 125 of the secure area confirms that user 115 is a person to be trusted with access to the secure area.

In the depicted example, administrator 125 is a security guard at an organization's front security desk. The security guard recognizes user 115 by sight as a trusted member of the organization. Other measures can be used instead of, or in addition to, this simple recognition. User 115 may need to provide a photo identification or a biometric identification (fingerprint, voice recognition, retinal scan); speak, write, or type a password or personal identification number (PIN) code; or respond to interview questions, or other measures, or some combination thereof. Similarly, the security guard or other administrator can consult a database to confirm that the user's information matches the organization's records, and that the user is indeed approved for access to the secure area.

After the out-of-band authentication has been successfully completed, the user's access card 110 is provided with a digital credential. The credential, discussed below, is generated by a trusted server 130, and is communicated over a data network or other communications link to a card reader 120 that is located within convenient range of the user. To complete the enrollment, card reader 120 loads the credential onto access card 110 through a contact-interface link 170. For example, the card reader and access card can be equipped with contact interfaces that use the ISO 7816 smart card standard. User 115 then carries the enrolled access card, loaded with the credential, as a proof that user 115 has undergone the out-of-band authentication.

Figure 6:
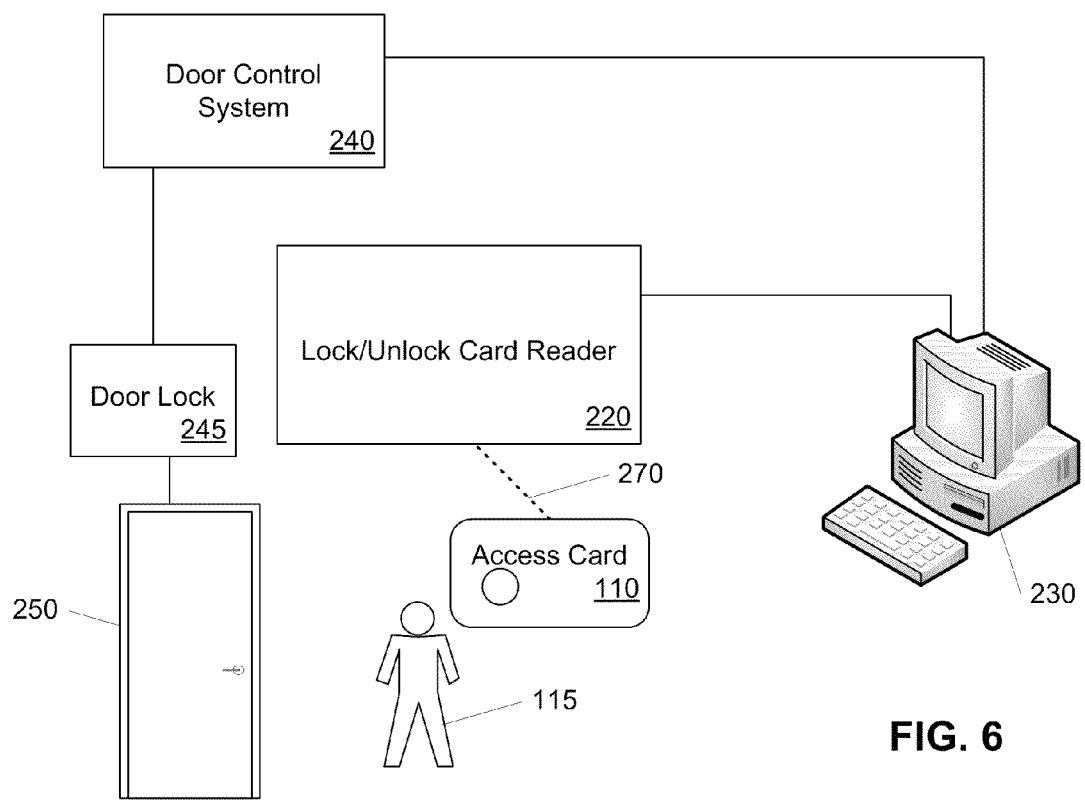
FIG. 6 illustrates an example of an environment in which the access card is used with a card reader to gain access to a secure area.

FIG. 6 shows an example of an environment in which access card 110 is used with a card reader 220 to gain access to a secure area. A door 250 provides entry to the secure area, and remains locked unless opened by a signal from a door controller system 240 to a door lock 245. Door 250 is typically located at a different location than the card enrollment of FIG. 5. For example, enrollment can be performed at the front security desk of an organization's building. Door 250 can be located in a different section or on a different floor of the building, or even in a different location altogether, such as a different building or a different city.

In this example, user 115 uses access card 110 to request that door 250 be unlocked. User 115 holds access card 110 in close proximity to card reader 220, which is typically mounted near door 250. Card reader 220 communicates with access card 110 through a wireless link 270. Card reader 220 performs a challenge-response interaction with access card 110, and receives the credential from access card 110. Card reader 220 communicates the credential and information about the challenge-response interaction to a trusted server 230. Trusted server 230 can be the same as or different from trusted server 130 from FIG. 5. Trusted server 230 analyzes the credential and the information about the challenge-response interaction. Based on this analysis, trusted server 230 determines whether access card 110 has indeed undergone the enrollment process from FIG. 5.

If trusted server 230 determines that access should be granted, an appropriate signal is sent from trusted server 230 to door controller system 240, which then signals door lock 245. Door lock 245 then unlocks door 250 for user 115.

Trusted server 230 can also communicate an appropriate signal back to card reader 220, which flashes a green light and/or emits a tone or otherwise indicates that access has been approved. If trusted server 230 determines that access should not be granted, trusted server 230 can communicate a different signal back to card reader 220, which can then flash a red light and/or emit a tone or otherwise indicate that access has been denied. Trusted server 230 can also log the failed access attempt by user 115, and can alert security personnel after an excessive number (one or more) of failed access attempts.

The above introduction includes two acts of "authentication." The out-of-band authentication (FIG. 5) is an authentication of the user. This first authentication verifies that the user is indeed a person who may access a secure facility. In this implementation, this first authentication must be successfully completed by a user in order to enroll the user's access card. After enrollment, the user can request access to the secure facility (FIG. 6) using the enrolled access card. The decision whether to grant or deny access involves electronic authentication of the access card. This second authentication verifies that the request comes from an access card that has indeed been enrolled.

Figure 7:
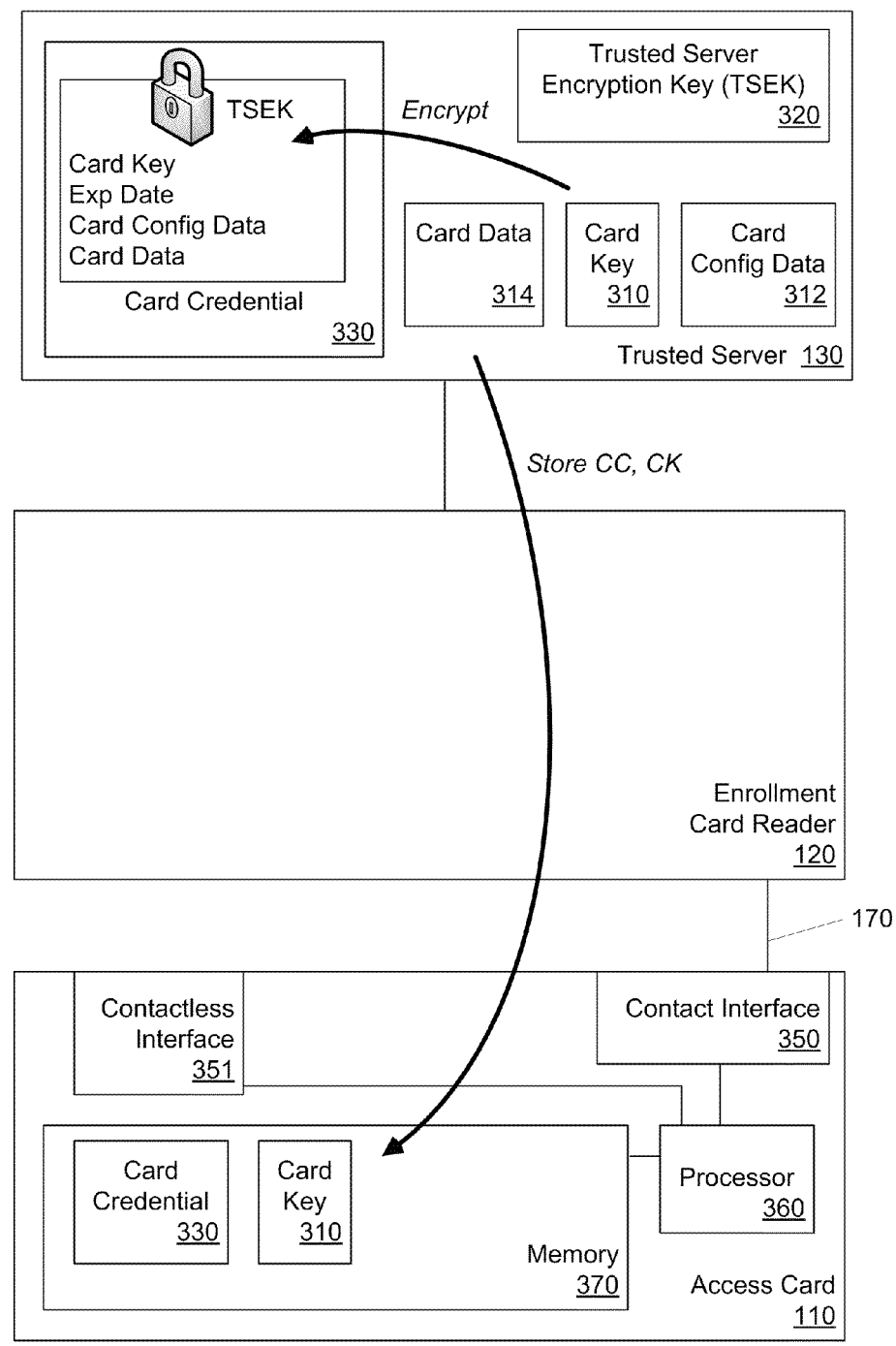
FIG. 7 illustrates an example of information flow during the enrollment operations from FIG. 5.

FIG. 7 shows an example of information flow during the enrollment operations from FIG. 5. This figure shows trusted server 130, card reader 120, and access card 110 from FIG. 5. Access card 110 includes circuitry for a contact interface 350, a processor 360, and a memory 370. Contact interface 350 enables communication with card reader 120 through contact-interface link 170. (Card 110 also includes a contactless interface 351, discussed below.) Processor 360 is coupled to contact interface 350 and to memory 370. Processor 360 obtains power from an off-card supply through contact interface 350.

After administrator 125 from FIG. 5 has completed the out-of-band authentication for user 115, administrator 125 uses trusted server 130 and card reader 120 to load information onto the user's access card 110. Trusted server 130 generates a card key 310 for access card 110. Card key 310 is a set of data that can be generated, for example, using a cryptographic key generation processes. In alternate implementations, trusted server 130 receives card key 310 from a key source (not shown) using appropriate key distribution procedures. In the illustrated example, card key 310 is unique to the particular key card 110, and/or to the particular user 115. In alternate implementations, each card key is shared among several key cards and/or among several users.

Trusted server 130 encrypts card key 310 using a trusted server encryption key (TSEK) 320. In various implementations, TSEK 320 is a relatively strong encryption key having a substantially large number of bits and is protected by relatively strong security practices. TSEK 320 is generally not the same as card key 310. For example, TSEK 320 can be accessible only to a limited number of trusted personnel within an organization. In various implementations, TSEK 320 can be a 1024-bit, 2048-bit, 4096-bit, or other-size public key from a public-private key pair. The encryption of card key 310 can correspondingly be performed using a public-key encryption (e.g., using Digital Signature Standard (DSS), elliptic curve, or RSA algorithms, or others). In various alternate implementations, TSEK 320 can be an 80-bit, 112-bit, 168-bit, or 256-bit, or other-size symmetric key. The encryption of card key 310 can correspondingly be performed using a symmetric-key encryption protocol (e.g., using Data Encryption Standard (DES), Triple DES (3DES), Advanced Encryption Standard (AES), Blowfish, Twofish, or Elliptic Curve Cryptography (ECC) procedures, or others).

Trusted server 130 generates a card credential 330 that includes the encrypted card key. Other information can also be included in the card credential, such as the lifetime of card key 310 (e.g., a lifetime, or expiration time and date, that causes the card key to be obsolete and unusable after a particular duration or point in time), card configuration data 312, and card data 314. In various implementations, these data 312 and 314 include information that is obtained from access card 110, or entered by administrator 125, or received from an access control list, or generated by trusted server 130, or combinations thereof.

Card configuration data 312 includes a description of access card 110. For example, different types of access cards are capable of performing different types of "on-card authentication protocols" to carry out the challenge-response calculations. The on-card authentication protocols are calculations that generate card responses based on the card key and the received challenge data. In various implementations, card configuration data 312 identifies which type of card is access card 110, and/or identifies which type of authentication protocol(s) can be performed by access card 110.

Card data 314 can include other types of information regarding access card, such as a name of user 115, an identifier of user 115, names or identifiers for the organizations of which user 115 is a member, a card identifier that is unique to access card 110, information regarding access control lists on which the card identifier is listed, information regarding a security clearance of user 115, information regarding which secure facility (or facilities) user 115 is permitted to access, or restrictions that apply to user 115 regarding time, duration, or escort requirements, or other information, or combinations thereof.

Depending on the implementation, some or all of these data 312 and 314 can also be encrypted using TSEK 320. It is also contemplated that additional encryption functions can also be used to generate card credential 330, and that various salt, hash, message authentication codes (MAC), and signature data can be included in card credential 330. In the illustrated example, card credential 330 is generated by using TSEK 320 to encrypt a combination of: card key 310, an expiration date for card key 310, card configuration data 312, and card data 314. As illustrated, these data are locked into card credential 330, protected by TSEK 320.

After generating card credential 330 in this manner, trusted server 130 transmits card credential 330 to card reader 120 over a data network or other communications link. Card reader 120 in turn transmits card credential 330 via contact-interface link 170 to access card 110. Card key 310 is also transmitted, securely, to access card 110. (It is contemplated that in alternate implementations, a trusted server can initially obtain the card key and/or card data from an access card. In such implementations, it may not be necessary to transmit the card key back to the access card.) Card credential 330 and card key 310 are then stored in memory 370 on access card. Card key 110 is stored in on access card 110 in such a way that it is protected from being readable by a malicious unauthorized user. In this example, enrollment is then complete for access card 110.

Figure 8:
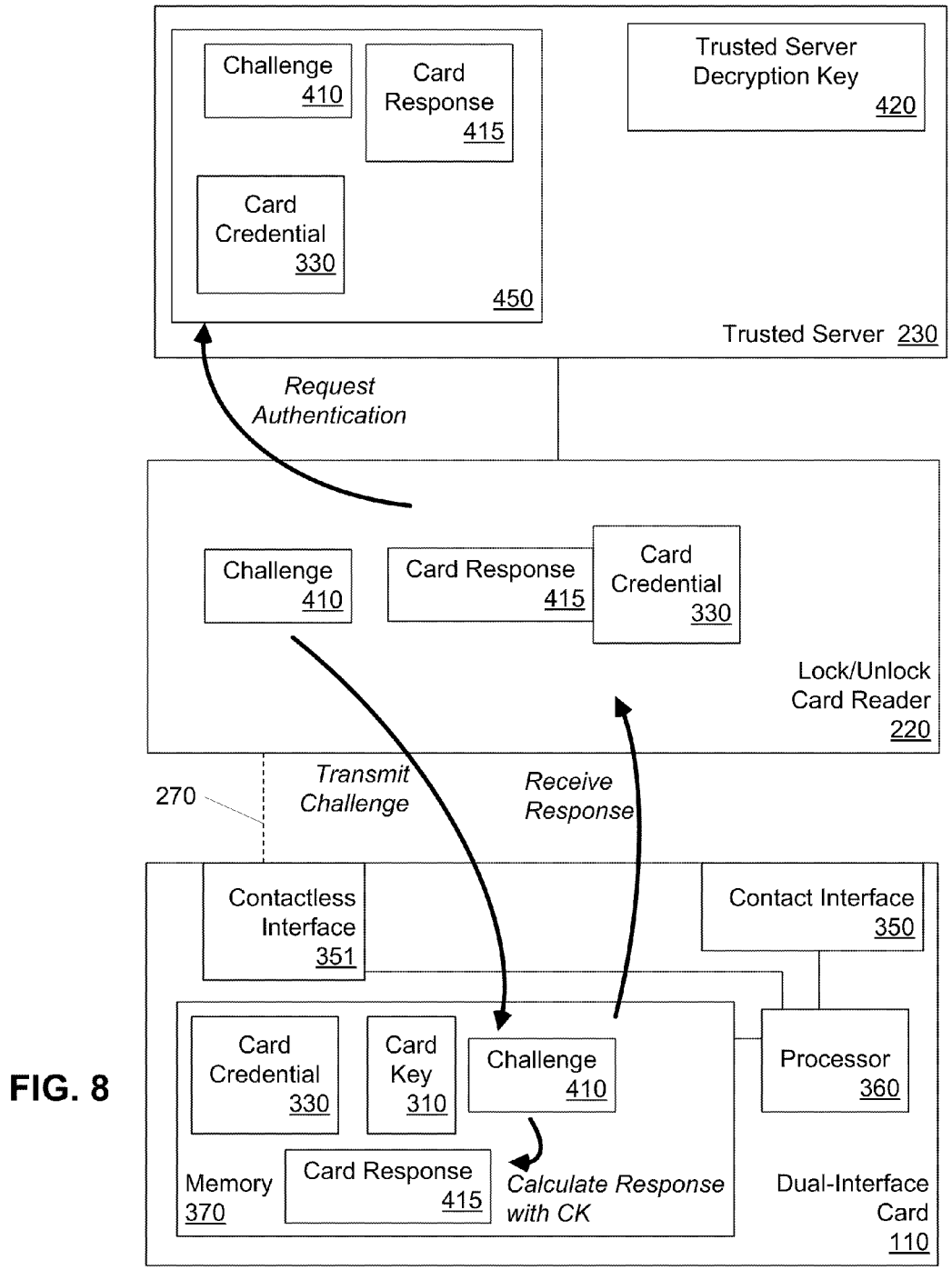
FIG. 8 illustrates an example of information flow during a first phase of the access operations from FIG. 6.

FIG. 8 shows an example of information flow during a first phase of the access request from FIG. 6. This figure shows trusted server 230, card reader 220, and access card 110 from FIG. 6. In this example, access card 110 has completed the enrollment described above with regard to FIG. 5, and is being used to request access to a secure area. Contactless interface 351 enables access card 110 to communicate with card reader 220 through wireless link 270. This communication is used for the challenge-response interaction between card reader 220 and access card 110. In some implementations, contactless interface 351 is a radio-frequency (RF) interface, and communicates with corresponding circuitry (not shown) in card reader 220 using electromagnetic waves. In various implementations, processor 360 and other circuitry in access card 110 are powered by electromagnetic waves received from card readers such as card reader 220. The power circuitry (not shown) can be included within or separate from contactless interface 351. In some implementations, the power circuitry uses inductive coupling and rectification to receive a particular frequency or frequencies of electromagnetic energy from card reader 220.

In this example, the challenge-response interaction begins after communication has been established between card reader 220 and access card 110. Card reader 220 recognizes that access card 110 has been presented to card reader 220. Card reader 220 then generates a challenge data 410. Alternatively, challenge data 410 can be generated on trusted server 230 and received by card reader 220. Challenge data 410 can consist of or include, for example, a large random number such as a 20-bit, 40-bit, 64-bit, 80-bit, or longer random number. Card reader 220 then transmits challenge data 410 to access card 110 through wireless link 270.

Access card 110 stores challenge data 410 into memory 370. Processor 360 then retrieves card key 310 and challenge data 410 from memory and executes an on-card authentication protocol using both of these data to generate a card response 415. In various implementations, the on-card authentication protocol is a calculation that includes a one-way hashing function. This calculation generates a hash of card key 310 and challenge data 410. The resulting hash is, or is used to generate, card response 415. In other implementations, the on-card authentication protocol involves a calculation that uses challenge data 410, followed by an encryption, signature, or MAC operation with card key 310.

The authentication protocol performed by processor 360 is designed to demonstrate that the access card has possession of the card key. To the extent that possession of the card key indicates that the user of the access card has undergone the enrollment process from FIG. 5, the on-card authentication protocol establishes that the user of the card key has previously undergone this out-of-band authentication.

The on-card authentication protocol is designed to be executed without compromising the security of the card key. Thus, the on-card authentication protocol preferably generates the card response in such a way that a malicious party cannot easily determine card keys by analyzing card responses. Various examples of hashing functions are contemplated for use in these calculations, such as Message-Digest Algorithm 5 (MD5), or a Secure Hash Algorithm (SHA-1, SHA-224, SHA-256, SHA-384, or SHA-512), or others. Alternatively, or in addition, various encryption functions are also contemplated for use in these calculations, such as DES, 3DES, AES, Blowfish, Twofish, or ECC.

When selecting an authentication protocol (or protocols) for processor 360, a designer can elect to balance various considerations. For example, high cryptographic security can increase processing overhead for processor 360. At some point, the processing overhead can be unacceptable, especially in implementations where processor 360 is powered by electromagnetic waves received from card reader 220. Such implementations provide convenience to a user: the user can "swipe" the access card by briefly holding or waving (for less than approximately 0.2, 0.5, 1.0, 2.0, or 5.0 seconds, for example) the access card close to the card reader (e.g., within a few inches or a few feet of the card reader). However, these implementations require processor 360 to execute the on-card authentication protocol—and the accompanying communication with the card reader—in a relatively short time, and with relatively little power available. In implementations where an access card is powered by a small on-board battery, the power constraints can be less important, but the short time constraints can still apply. In these and other implementations, power and time constraints can limit the complexity of the on-card authentication protocol. Similarly, these constraints can limit the length of the card key, the length of the challenge data, and/or the length of the card response to the challenge data. In various implementations, designers can avoid using high-overhead algorithms, such as some public-key protocols, in the authentication protocol that is performed by processor 360. Moreover, designers can refrain from processing card credential 330 in the on-card authentication protocol.

After processor 360 generates card response 415, access card 110 transmits card response 415, along with card credential 330, to card reader 220. Card reader 220 receives these data from access card 110 via wireless link 270. In the illustrated example, card reader 220 does not itself analyze the results of the authentication protocol. Instead, card reader 220 requests assistance from trusted server 230. Card reader 220 transmits a request for authentication 450 to trusted server 230 through a secure link. This request includes card credential 330, challenge data 410, and card response 415. (In some implementations, a card reader can initially obtain challenge data from a trusted server. In these implementations, it is may not be necessary to transmit the challenge data back to the trusted server.) As discussed below, trusted server 230 then uses a trusted server decryption key 420 to examine the data received in request for authentication 450.

Figure 9:
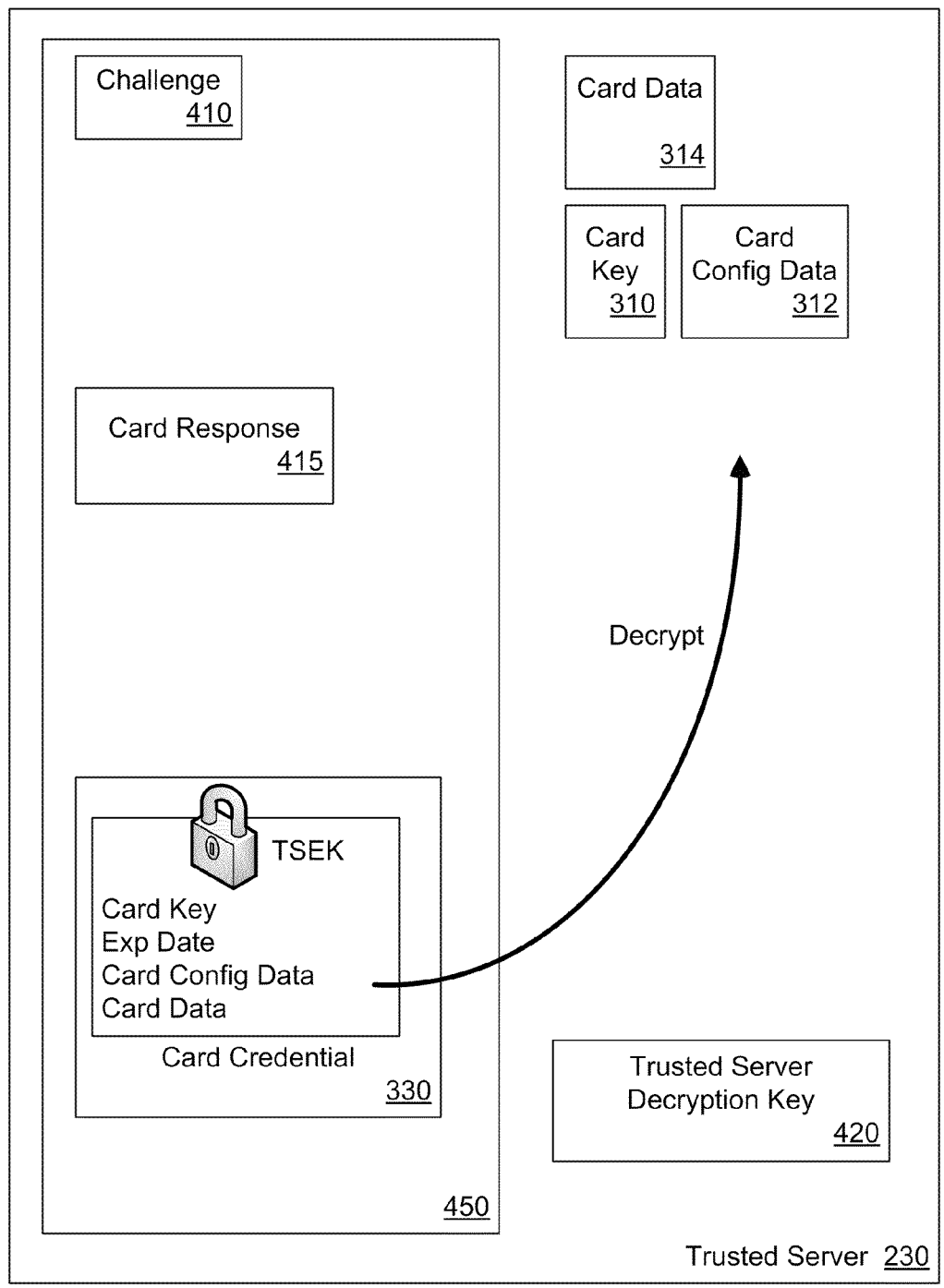
FIG. 9 illustrates an example of information flow during a second phase of the access operations from FIG. 6.

FIG. 9 shows an example of information flow within trusted server 230 during a second phase of the access request from FIG. 6. After receiving request for authentication 450 from card reader 220, trusted server 230 decrypts card credential 330 and determines whether card response 415 is an acceptable response to challenge data 410. The decryption is performed using a trusted server decryption key (TSDK) 420. TSDK 420 is a securely protected key that is available to trusted server 230. TSDK 420 is related to TSEK 320, which was discussed above with regard to trusted server 130 in the enrollment environment of FIG. 5. In some implementations, TSDK 420 is a private key from a public-private key pair, and TSEK 320 is the corresponding public key from the public-private key pair. In some implementations, TSDK 420 is a symmetric key, and is the same as TSEK 320. These symmetric-key implementations may offer a streamlined key management in situations where card enrollment is overseen by the same server as card authentication, e.g., where trusted server 230 is the same as trusted server 130.

This decryption with TSDK 420 unlocks the contents that are protected by TSEK 320, and provides trusted server 230 with card key 310, card configuration data 312, and card data 314. In this example, therefore, trusted server 230 does not require advance knowledge of card key 310. Instead, card key 310 is obtained from the unlocking of the card credential that was received in request for authentication 450. This is an example of a "stateless" implementation, where a trusted server can operate without requiring a priori knowledge such as a log of out-of-band authentications and/or information recorded in an access control list. Such implementations may provide various advantages. In this example, a card-authenticating server (e.g., trusted server 230) functions without needing direct communication with an enrolling server (e.g., trusted server 130). Instead, these two servers effectively communicate through information stored on a physical token (e.g., access card 110). In other implementations, the security of the overall system can be augmented by such inter-server communication and/or by the use of access control lists.

The illustrated example applies an encryption and decryption technique that is different from the on-card authentication protocol. In particular, the relevant key (TSDK 420) and decryption calculations for unlocking card credential 330 are different from and independent of the key (card key 310) and challenge-response calculations that were used by the processor on the access card. Thus, obtaining the card key from the card credential uses an encryption protocol that is independent of the on-card authentication protocol.

Figure 10:
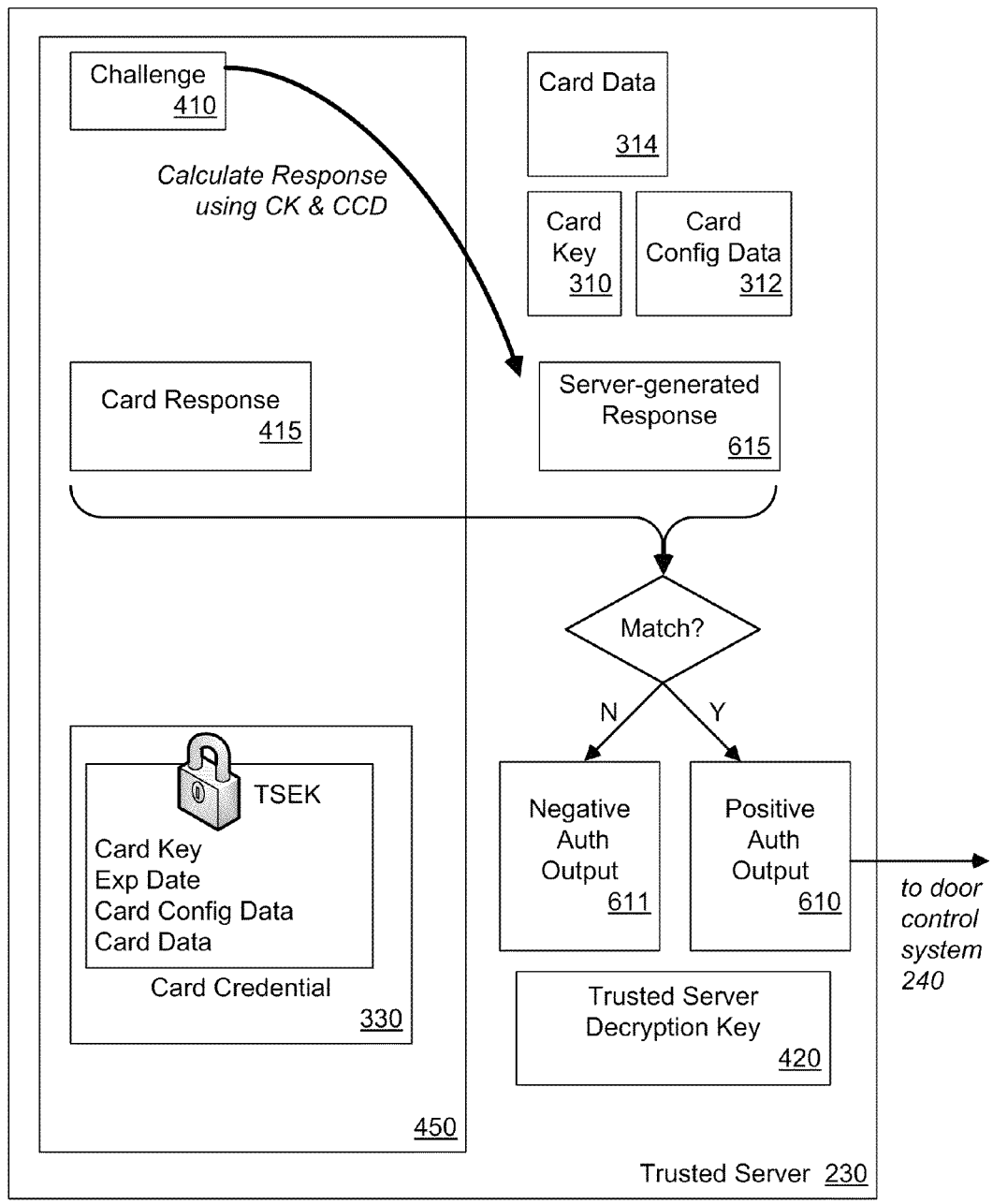
FIG. 10 illustrates an example of information flow during a third phase of the access operations from FIG. 6.

FIG. 10 shows an example of information flow during a third phase of the access request from FIG. 6. After obtaining card key 310 from card credential 330, trusted server 230 locally generates a response 615 using card key 310 and challenge data 410. This server-generated response 615 is therefore based on the same data (card key 310 and challenge data 410) that were used by access card 110 for the on-card authentication protocol. In the context of FIG. 10, the card response 415 received from access card 110 is under scrutiny by trusted server 230. Card response 415 is treated as a "candidate response": the response is evaluated to determine whether it is an appropriate response to challenge data 410.

In one implementation, this evaluation is done by comparing card response 415 to server-generated response 615. If these data do not match, then card response 415 is understood to have been generated by a device that either did have possession of card key 310, and/or was not responding to challenge data 410. Trusted server 230 then generates a negative authentication output 611. Negative authentication output 611 can be provided as an alert to an administrator or an automated security monitoring system, noting that an invalid access request was made. Negative authentication output 611 can be also be provided as feedback to card reader 220 from FIG. 6, which can then flash a red light or emit a tone indicating that access has been denied. Door 250 from FIG. 6 is not unlocked in response to negative authentication output 611. If instead card response 415 and server-generated response 615 do match, then card response 415 is understood to have been generated by a device that did have possession of card key 310, and which was responding to challenge data 410. Trusted server 230 then generates a positive authentication output 610. Positive authentication output 610 is provided to door controller system 240 from FIG. 6, which then unlocks door 250. User 115 can then gain access to the secure area behind door 250.

In addition to, or instead of, communicating with door controller system 240, trusted server 230 can communicate directly with an electronic lock on the door (e.g., door lock 245), a door controller, a magnetic lock, or other system that directly or indirectly controls access. The communication can be based on positive authentication output 610 or on other analyses of received card credentials and information about challenge-response interactions.

In other embodiments, positive authentication output 610 prompts trusted server 230 to initiate additional security checks before opening door 250. For example, trusted server 230 can first verify that an expiration date obtained from card credential 330 has not been exceeded. As another example, trusted server 230 can use a user identification from card data 314 to consult an access control list (not shown), and confirm that according to the access control list, user 115 is approved for access to door 250.

Figure 11:
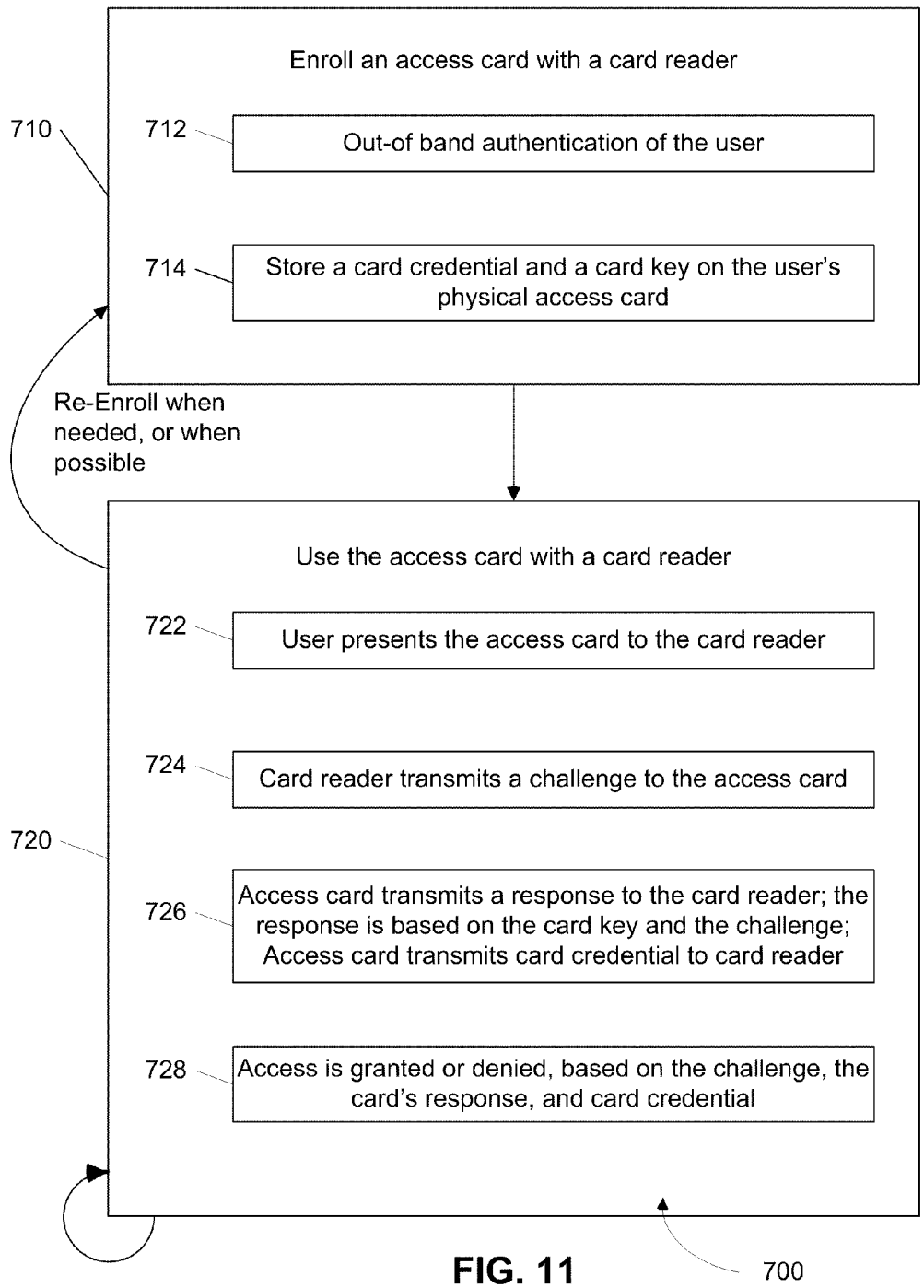
FIG. 11 illustrates an example of a process used in an access control environment.

FIG. 11 shows an example 700 of a process used in an access control environment. In this example, process 700 includes two sets of operations. An access card is enrolled with a card reader (such as, for example, card reader 120) in act 710, which includes acts 712 and 714. Act 710 can be used, for example, for the operations discussed above with relation to FIG. 5. The access card is then used with a different card reader (such as, for example, contactless card reader 220, or a contact-interface reader) to gain access to a secure facility in act 720, which includes acts 722, 724, 726, and 728. Act 720 can be used, for example, for the operations discussed above with relation to FIG. 6.

After an enrollment in act 710, the access card can be used to access a secure facility more than once (e.g., when a user exits the secure facility and later needs to return, or when the user needs to login again to the same protected computing facilities). The access card can also be used to access additional secure facilities. These repeated access attempts are indicated by a looping arrow in FIG. 11, which causes act 720 to repeat. From time to time (e.g., occasionally or on a set schedule), the access card can be re-enrolled either voluntarily or as required by a security protocol. This re-enrollment is indicated by a looping arrow in FIG. 11 that returns from act 720 to act 710.

It is contemplated that the access card can be a physical-access card, and that the secure facility can be a secure area such as one or more offices, office suites, buildings, residences, data centers, or other secure areas, or combinations thereof. It is also contemplated that the access card can be a logical access card, such as a login token card, and the secure facility may include secure computing equipment or information, such as secure computer systems or databases. Combinations of physical access and logical access are also contemplated, as well as particular applications to financial accounts, secure government facilities, military facilities, corporate facilities, and organizational facilities. In one example, process 700 is used to protect a military research and development laboratory from improper physical access by unauthorized personnel. In another example, process 700 is used with appropriate card-reader hardware to protect data on laptops used by humanitarian aid workers from improper access by unauthorized personnel. In yet another example, process 700 is used for access to monetary funds (e.g., on-line purchases or transfers, or withdrawals from automated teller machines) by an account holder at a financial institution.

In various implementations, the interactions between the card reader and the access card in act 710 are contact-based interactions. For example, these interactions can use contact-interface link 170 from FIGS. 5 and 7. Alternatively, or in conjunction, these interactions can use a contactless interface for communication between the card reader and the access card.

Act 710 begins with act 712, in which a user undergoes an out-of-band authentication process. Act 712 is an operation that establishes that a user of the access card is a legitimate user, authorized to gain access to one or more of an organization's secure facilities. In various implementations, act 712 can include a face-to-face interaction between a user and a human gatekeeper of a secure facility (e.g., a facial comparison with a photo identification or other biometric identification of the user, a security interview, and the like), and/or an electronic interaction with an automated gate-keeping circuit or software (e.g., entry of a personal identification number on a keypad at a front security desk, entry of a userid and password or other computer login through a remote login procedure, authentication of a digital certificate or other user credential, and the like). The out-of-band authentication can also include additional checks to review access rights of the user. For example, databases can be used to check an approved set of locations for the user, a security level of the user, a security alert status of the secure area or the organization (high alert, low alert, lockdown, and the like), an access history of user, an access history of the access card, suspected security compromises, relevant administrator instructions, a revision of an access control list, or other factors, or combinations thereof.

In act 714 a card credential and a card key are stored on the access card. In various implementations, the card credential and card key are generated only after the out-of-band authentication process of act 712.

The card credential is generated by a trusted server (such as, for example, trusted server 130). The trusted server used in act 714 can be, for example, remotely located from the card reader in a secure computing center and connected to the card reader through a secure communications link. Alternatively, the trusted server used in act 714 can be incorporated within the card reader. In one implementation, the trusted server used in act 714 is implemented in a replaceable smart card that is securely mounted within the card reader. The card key can also be generated by the trusted server. The card key and card credential are stored in one or more memories on the access card.

After the enrollment in act 710, the access card can then be used in act 720 to gain access to a secure facility using a card reader. In various implementations, the interaction between the card reader and the access card in act 720 are contactless interactions. For example, these interactions can use wireless link 270 from FIGS. 6 and 8. Alternatively, or in conjunction, these interactions can use a contact interface for communication between the card reader and the access card.

The card reader used in act 720 is generally deployed at a different location from the card reader used in act 710. In various implementations, the card reader used in act 720 is a contact-interface reader or a contactless interface reader mounted next to a door or at a security checkpoint that protects a secure area, such as an entry door, an elevator door, a pedestrian gate, an access gate for vehicles, or other doors, to regulate physical movement within an organization, for example.

It is also contemplated that in some implementations, the card reader used in act 720 is the same as the card reader used in act 710. For example, a user may use a card reader for enrollment and then immediately use the same card reader to test the enrollment by requesting access.

As another example, a card reader may serve a double purpose, enabling authentication for cards that it has previously enrolled. Such a double-purpose card reader can be deployed next to an off-site computer, for example. It is contemplated that such a card reader could be plugged into a USB port of a user's home computer or portable computer, or otherwise connected to or integrated into an off-site computer. In this example, the card reader regulates remote access from the off-site computer to computing equipment or to information. Alternatively, or in addition, the card reader regulates access to data that is stored within the off-site computer itself. Such a card reader can be used for enrollment operations (act 710) by requiring entry of an account password or some other out-of-band authorization (e.g., a simultaneous voice telephone call, or entry of a time-varying token code, for example) before granting access to the protected data. This same card reader can be used again after some time (act 720) to let the user continue to have access to the protected data, but without having to repeat the out-of-band authorization.

Act 720 begins with act 722, in which a user holds the access card near a card reader, or otherwise presents the access card to the card reader. In one implementation, the card reader continuously broadcasts an RF signal. The access card detects the signal when it is within close range (a few inches to a few feet) of the card reader, and transmits an RF response to inform the card reader of the presence of the access card. In another implementation, the card reader becomes aware of the access card through a change in RF coupling to the surrounding environment, such as an inductive coupling that occurs when the access card is brought within close range. In other implementations, the user presents the card by placing the access card on or in the card reader.

In act 724, the card reader transmits a challenge to the access card. In act 726, the access card returns a response to the card reader. The response is based on the challenge and on the card key that was stored on the access card in act 714. The access card also transmits the card credential to the card reader.

In act 728, the communications between the card reader and access card are evaluated to decide whether access should be granted to the secure facility. The evaluation is performed by a trusted server (such as, for example, trusted server 230) that can be different from the trusted server discussed above with regard to act 714. The trusted server used in act 728 can be remotely located from the card reader in a secure computing center, and connected to the card reader through a secure communications link. Alternatively, the trusted server used in act 728 can be contained within the card reader. In one implementation, the trusted server used in act 728 is implemented in a replaceable smart card that is securely mounted within the card reader.

Figure 12:
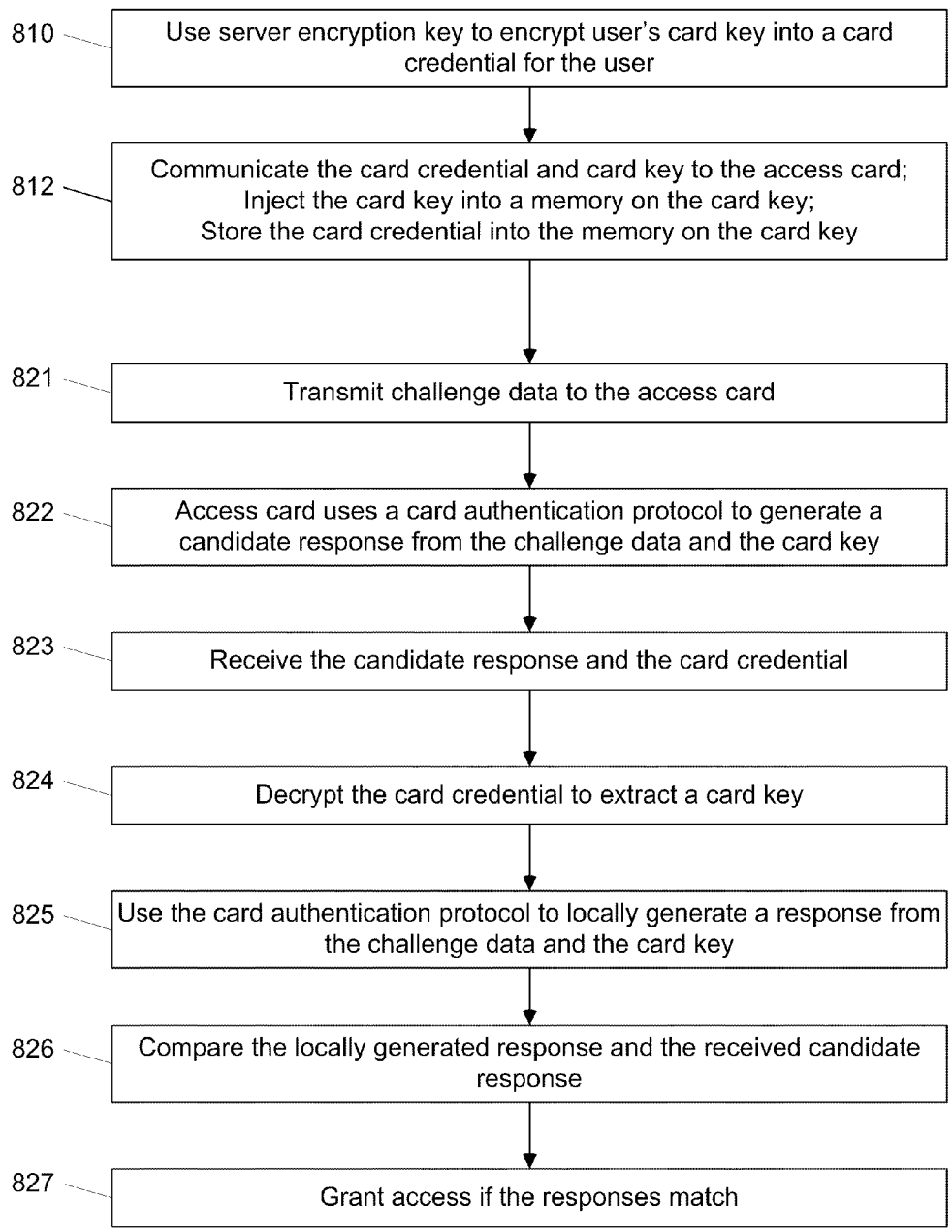
FIG. 12 illustrates an example of details of some of the operations illustrated in FIG. 11.

FIG. 12 shows an example 800 of a process with details of some of the operations shown in FIG. 11. In various implementations, acts 810 and 812 can be used in act 714 from FIG. 11 to enroll an access card. Similarly, acts 821, 822, 823, 824, 825, 826, and 827 can be used in acts 724, 726, and 728 from FIG. 11 to authenticate a request for access that was made with the access card. It is noted that various different types of hardware (e.g., access cards, card readers, and servers) and software (e.g., different orderings or combinations of the various acts in processes 700 and 800) are contemplated in addition to the specific examples discussed with respect to FIGS. 11 and 12.

In act 810, a trusted server uses an encryption key, for example TSEK 320 from FIG. 7, to encrypt a card key into a card credential. In various implementations the trusted server can also sign the card credential after (or before) the encryption operation. The card key can also be generated by the trusted server. In act 812, the card credential and card key are communicated to the access card, and are stored in one or more memories on the access card. The card key is stored in on the access card in such a way that it is protected from being readable by an unauthorized user. In various implementations, the card key is injected into a section of memory on the access card (e.g., a key slot) such that the card key is accessible only to a processor on the access card, and the processor is configured not to output or otherwise reveal the raw contents of this section of memory. The card key thus cannot be read from the access card.

In act 821, a challenge is transmitted to the access card. In various implementations, the challenge is (or includes) a unique random number, generated solely for the purpose of challenging the access card on this access attempt. The challenge can be transmitted by a card reader or by a trusted server (via the card reader). In act 822, the access card uses an on-card authentication protocol to generate a candidate response. The candidate response is based on the challenge and on the card key that was stored on the access card in act 812. In act 823, the candidate response is received by a trusted server from the access card. The card credential, from act 812, is also received from the access card.

In act 824, the trusted server uses a decryption key, for example TSDK 420 from FIGS. 8 and 9, to decrypt the card credential that was received from the access card in act 823. In various implementations the trusted server can precede (or follow) the decryption by authenticating a signature on the card credential. The decryption recovers a card key, which is expected to be the same as a card key that was generated in act 810.

In act 825, the trusted server locally generates a response to the challenge that was posed in act 821. To generate this response, the trusted server uses the same on-card authentication protocol that was used in act 822 by the access card. The trusted server can use information extracted from the card credential to determine which of several on-card authentication protocols was used by the access card. The server generates its response based on the challenge and on the card key that was recovered in act 824.

In act 826, the trusted server compares the locally generated response from act 825 to the candidate response that was received in act 823. If and only if these responses match, then the candidate response is understood to have been generated by a device that had possession of the card key and was responding to the challenge data.

In act 827, if the locally generated response fails to match the candidate response, the trusted server denies access. If the locally generated response matches the candidate response, the trusted server initiates a process that grants access (or which can lead to granting access). In various implementations, the subsequent process can include additional checks to review access rights of the user based on data extracted from the card credential (e.g. card data 314) and/or data obtained by the trusted server from databases such as access control lists. For example, the extracted data and/or a positive access control list and/or a negative access control list can be used to check other forms of key lifetime (e.g., "valid-until" time limit, a duration-of-use limit, a number-of-uses limit, a predetermined time mark), an approved set of locations for the user, a security level of the user, a security alert status of the secure area of the organization (high alert, low alert, lockdown, and the like), an access history of the user, an access history of the access card, a suspected security compromise, an administrator instruction, a revision of an access control list, or other factors, or combinations thereof.

FIGS. 1-12 illustrate some of the operational examples of the techniques and tools contemplated for use with access cards. Those having ordinary skill in the art will readily recognize that certain steps or operations described herein can be eliminated or taken in an alternate order, and that various arrangements and alternatives of hardware components can be used.

For example, it is contemplated that the trusted server keys (e.g., TSEK 320 and TSDK 420) can be managed by a public key infrastructure (PKI), which securely manages the distribution of keys among trusted servers and, when necessary, the revocation of keys. It is also contemplated that the trusted server keys can be symmetric keys that are protected by other security procedures and key-management protocols. The security of the trusted server keys can be managed and protected with different and separate procedures than the card keys. Thus, in various implementations, a compromise of a card key (e.g., card key 110) does not cause a trusted server key (e.g., TSEK 320 or TSDK 420) to be compromised. If a malicious party were somehow to compromise an access card and read a card key from the access card, this compromise would have a limited effect, providing access only during the lifetime of the compromised card key, and not directly leading to a compromise of a trusted server key.

Moreover, the trusted server keys can have larger key sizes and can use more computationally intensive encryption protocols than the card keys and their on-card authentication protocols. In various implementations, the trusted server keys can have key lifetimes that are substantially longer than the lifetimes of the card keys. For example, a key lifetime recorded in TSEK 320 or TSDK 420 (e.g., weeks, months, or years) can be substantially longer than a key lifetime recorded in card credential 330 (e.g., hours, days, or weeks). In various implementations, the lifetime for card keys is selected to be something less than an estimated time to compromise a card key, and the lifetime for trusted server keys is selected to be something less than an estimated time to compromise a trusted server key.

The system can also be implemented with revocation mechanisms for card keys or for users. Card-key revocation or user revocation can be implemented, for example, using access control lists. Alternatively, revocation of card keys or users can be done with revocation lists that are more concise than access control lists. Various offline or out-of-band checks can also be done to screen for compromised or revoked users, access cards, card keys, or card identifiers. In various implementations, revocations and other responses to the compromise of a card key can be implemented without invoking higher-level responses that would be needed in response to the compromise of a trusted server key.

It is also contemplated that access control lists can be used to augment the authentication procedures described above. For example, a system can use an access control list to retrieve additional information regarding a user, such as permissions or restrictions previously established for the user. The information retrieved from an access control list can be used in conjunction with information that is retrieved by the decryption of a card credential (such as information in FIG. 9 from card data 314 and/or card configuration data 312, for example). For example, a card identifier can be stored in card data 314, and an access control list can be used to confirm that the user's access card matches a card identifier that was previously stored in an access control list (e.g., during or before an enrollment procedure such as act 710). Alternatively, various implementations can avoid the use of access control lists altogether; these implementations may extract all relevant permissions and restrictions for a user from the card credential. Such implementations enable stateless security systems that can authenticate access cards without needing to consult access control lists.

By avoiding a reliance on access control lists, designers may facilitate inter-organization authentication. In one example, a user undergoes an out-of-band authentication and enrollment (discussed above with regard to FIG. 5) at a first organization in the morning of a particular day. This authentication provides the user with a credential that expires at the end of that day. The user can then use the access card to enter secure areas (discussed above with regard to FIG. 6) at the first organization throughout the morning. In the afternoon of the same day the user needs to access secure areas within a second organization. The second organization is different from the first organization, but cooperates with the first organization. In this example, the second organization shares static information such as decryption keys (e.g. TSDK 420) with the first organization, but does not share continually updated information such as access control lists. When the user requests entry to a secure area in the second organization, a trusted server in the second organization can respond to the request (similar to the situation described above with regard to FIG. 6). In this example, the trusted server at the second organization compares a candidate response to a server-generated response (e.g., act 826), but does not need any additional confirmation of the candidate response or the underlying card key from an access control list.

Such an implementation can be useful, for example, in situations where one organization performs enrollment operations and a second, different, organization relies on those enrollments. The second organization can rely on (a) the integrity of its decryption key and (b) the successful matching of the candidate response to the locally generated response to verify that the access attempt is being made with an access card that has successfully undergone enrollment. The second organization can use additional information in the decrypted card credential, for example to confirm that the successful enrollment was recent.

Hybrid reliance on access control lists is also contemplated. Continuing the above example, the second organization can consult an internal access control list for purposes other than authenticating the user or the user's access card. For example, the second organization's internal access control list can indicate which of several secure areas within the second organization can be accessed by this user.

Moreover, it is contemplated that a third organization can cooperate with the first organization, but is not willing to share trusted server keys with the first organization. The third organization can, however, cooperate such that users can employ a single access card for both the first and third organizations. The third organization can be a bank (or other financial institution) that uses a separate set of trusted server keys, which are used to enroll access cards with corresponding card credentials that allow the users to withdraw or otherwise use money on deposit (or on credit) at the bank. The bank can require the user to undergo an out-of-band authentication, in person or on-line, to demonstrate that the user indeed holds an account at the bank. For a limited time thereafter (e.g., hours or days, or perhaps weeks if the user informs the bank that she will be travelling on vacation), the user can use the access card to withdraw funds from a conforming automated teller machine (ATM) or use a portable card reader to direct transfers of funds from the account or authorize purchases with funds from the account.

In the above example, one access card is configured to store two card credentials and two card keys: one card key and card credential are for the first and second organizations, and the other card key and card credential are for the third organization. In other environments, the access card can be configured to store simultaneously three (or more) different card credentials, for three or four (or more) different organizations.

It is also contemplated that a single trusted server can be used with a variety of types of access cards. For example, an organization can have deployed three different types of access cards, which perform three different types of on-card authentication protocols. The card credential stored on an access card can indicate which type of on-card authentication protocol is performed by that access card. This information can be recorded, for example, in card configuration data 312. When the trusted server decrypts the card credential, it uses this information to decide which on-card authentication protocol should be used to locally generate the server response (e.g. response 615).

This flexibility with regard to different types of access cards can be useful to system designers when performing an incremental (user-by-user, or area-by-area) upgrade of a security system. Depending on the implementation, the different types of access cards may or may not require different types of card readers.

It is also contemplated that the tools and techniques described above can be added incrementally, on an area-by-area basis, to an organization that has an existing legacy access control system. The legacy system may use legacy card readers and a large number of existing legacy access cards issued to existing users. One or more of the areas can then be upgraded to use the techniques described above. In one example, a limited number of personnel who need to access the upgraded areas can be given access cards (such as access card 110, for example) that require an out-of-band authentication and can carry a card credential such as described above. Other users can continue to use the legacy access cards. The card readers for the upgraded area can then be connected to a trusted server (such as trusted server 230) that can decrypt the card credentials. This trusted server can then transmit authentication outputs to the legacy access control system, which is connected with a legacy door controller system. Depending on the implementation, the card readers for the higher-security areas may need to be upgraded (or replaced), but this upgrade can be carried out on an area-by area basis, without disrupting the entire security operations at one time.

In one example, the legacy card readers transmit card identifiers as the output to authentication requests. The card identifiers are unique identifiers that conform to a format for the legacy system. The legacy card readers transmit this output to the legacy access control system. The legacy access control system checks a received card identifier against an access control list to determine whether or not to open a door. This type of legacy system can be upgraded, one secure area at a time, by deploying a trusted server (such as trusted server 230) between the upgraded secure areas and the legacy access control system. When a user requests access to a non-upgraded area, the legacy system operates normally. When a user requests access to an upgraded area, the trusted server performs operations (such as acts 823-826) to determine whether the user's access card is responding appropriately to challenge data with a card key. If the internal comparison successfully authenticates an access request, the trusted server uses a card identifier (received, for example, from card data 314) as an output that is passed on to the legacy access control system for further comparison to the access control list. However, if the internal comparison fails to authenticates an access request, the trusted server does not generate an authentication output, and the legacy access control system is not prompted to consider the access request.

It is also contemplated that various implementations can provide convenience to a user by occasionally re-enrolling the user's access card during an access request. For example, in one example a user completes an enrollment by undergoing an out-of-band authentication in the morning of a working day (e.g., by interacting with a front-desk security guard or by logging in from a home computer). The enrollment stores a card credential onto the user's access card, with a lifetime of 8 hours noted in the card credential. Over the next six hours, the user behaves in a manner that is in accordance with standard security procedures (e.g., by attempting to access only permitted areas in a building, or by re-logging every two hours using a card reader at home). No security alerts are posted over the next six hours. In view of these normal operations, the security system may renew the enrollment of the user by automatically replacing the card credential on the user's access card with a renewal card credential, whenever the user presents the access card to a card reader. This new card credential can include, for example, a lifetime of an additional 4 hours beyond the originally noted lifetime.

Conversely, it is contemplated that an enrollment may be withdrawn in response to an abnormal behavior of a user, or in response to a security policy not being met. Continuing the above example, if the security system is compromised, or if the user does something that is not approved by standard security procedures, then the next time the user presents the access card to a card reader, the card credential on the access card can be deleted, amended with a cancelation notice, or otherwise revoked. The security policy could be deemed as not being met due to, for example, the detection of an intruder, a report of questionable activity, a passage of a predetermined time interval, a passage of a predetermined time mark, an excessive number of access attempts, a suspected security compromise, a user instruction for alert, a revision of an access control list, the user attempting access to a forbidden area or to forbidden data, or the entering an correct PIN code or password, among others.

After a user's card credential has been revoked, the user can be required to undergo an in-person re-enrollment. The re-enrollment can provide confirmation of the validity of the user, and possibly a review of the security clearance of the user.

Similarly, it is contemplated that card credentials can be withdrawn in response to a security alert. The withdrawal can be organization-wide, or can be limited to credentials for a particular area(s) or a particular user(s). The withdrawal would be performed the next time that the access card is presented to a card reader, for example, the next time the user attempts to enter a secure area. Such a withdrawal can involve the consultation of an access control list or a revocation list, and can involve the examination of restrictions included in a card credential.

Moreover, various operations discussed with respect to FIGS. 1-12 can be implemented as one or more software programs (or modules) for one or more processors. Those having ordinary skill in the art will readily recognize that various operations and calculations, such as cryptographic operations, communications operations, or data processing operations, and various techniques discussed above can be implemented using software in a variety of computer languages, including, for example, traditional computer languages such as assembly language, Pascal, and C; object oriented languages such as C++, C#, and Java; and scripting languages such as Perl and Tcl/Tk. Similarly, various operations can be implemented as hardware modules such as application-specific integrated circuits (ASICs), microcontrollers, or other appropriate circuits.

The software can be encoded on a computer readable storage medium as instructions executable on one or more processors, for example on various servers, card readers, or smart cards, or combinations thereof. The computer readable storage medium can include a non-volatile or volatile solid-state storage medium (e.g., flash memory, dynamic random access memory, and the like), a magnetic storage medium (e.g., hard disk, a floppy disk, and the like), or an optical storage medium (e.g., CD-ROM, CD-R, CD-RW, DVD-ROM, and the like), or combinations thereof. Alternatively, or in addition, the software programs can also be provided to a system using a communications medium, such as a transmission line or electromagnetic wave, conveying signals encoding the instructions. Separate instances of the programs can be executed on separate computer systems. Thus, although certain steps have been described as being performed by certain devices, software programs, processes, or entities, this need not be the case and a variety of alternative implementations will be understood by those having ordinary skill in the art. Additionally, those having ordinary skill in the art will readily recognize that the techniques described above can be utilized with a variety of different access cards and computing systems with variations in, for example, the number and type of access cards, communications interfaces, servers, and card readers.

Figure 13:
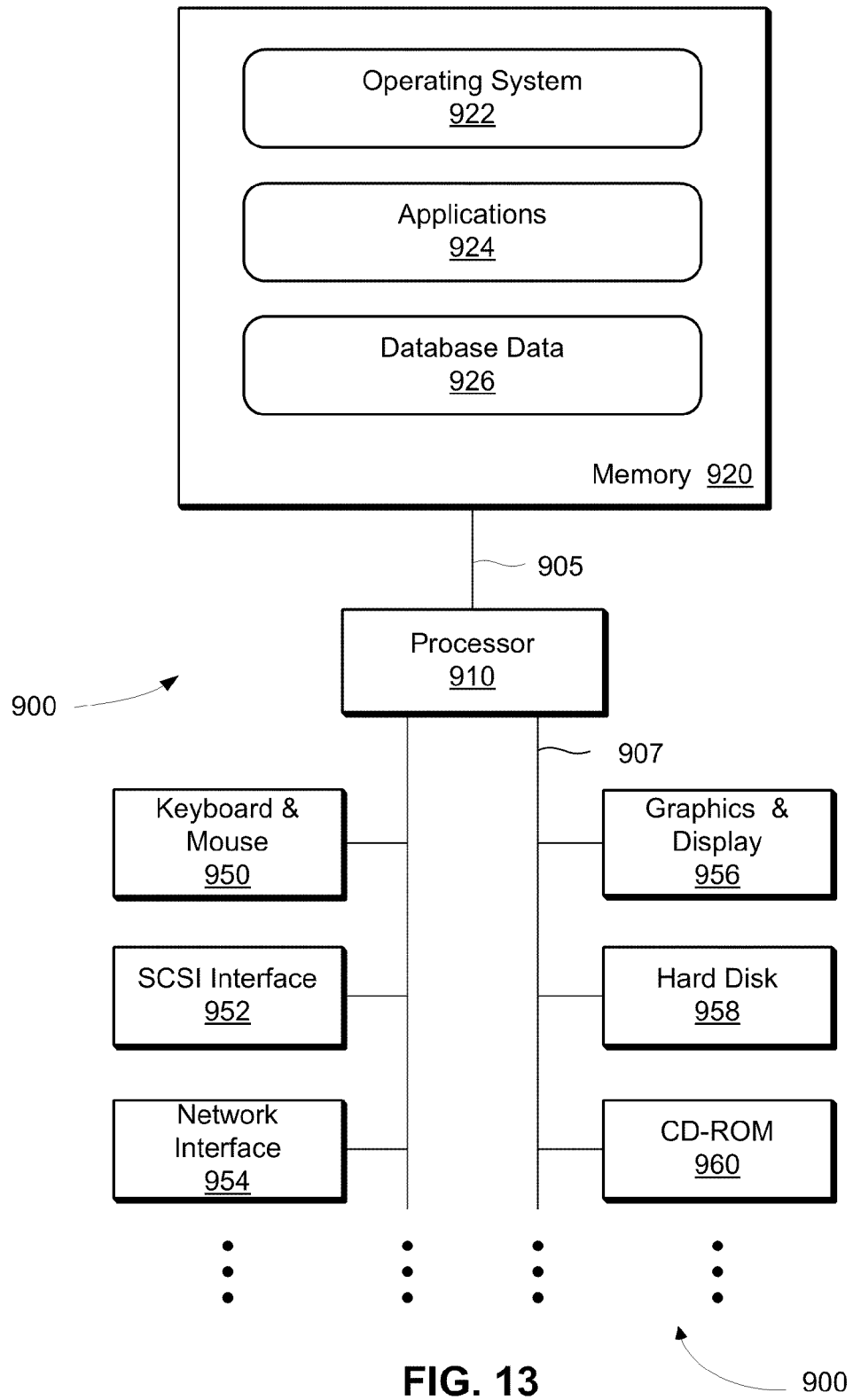
FIG. 13 is a block diagram of one implementation of a computer system that may be used for one or more of the techniques described herein.

FIG. 13 is a block diagram of one implementation of a computer system 900 that may be used for one or more of the techniques described herein. For example, the computer system 900 may be an implementation of one of the previously described portable computer 10, device 41, or trusted servers 130, 230, for example, and depicts elements that may be used in various embodiments of other components, such as card readers 120, 220. Computer system 900 may include a processor 910 and a memory 920 coupled together by a communications bus 905. Processor 910 may be a single processor or a number of individual processors working together. It is also contemplated that processor 910 may be one or more virtual processors usable with interpreted languages. Memory 920 may be a random access memory (RAM) or some other dynamic storage device and may be capable of storing instructions to be executed by the processor, e.g., an operating system 922 and applications 924, as well as database data 926. Operating system 922 may include software for implementing a file system and communications protocols. Applications 924 may include authentication routines, encryption routines, management programs for access control lists and user databases, security policy software, cryptographic packages, user interfaces, and others. Memory 920 may also be used for storing temporary variables or other intermediate information during the execution of instructions by the processor 910.

Computer system 900 may also include devices such as a keyboard & mouse 950, a SCSI interface 952, a network interface 954, a graphics & display 956, a hard disk 958 and a CD-ROM 960, all of which are coupled to the processor 910 by a communications bus 907. It will be apparent to those having ordinary skill in the art that the computer system 900 may also include numerous elements not shown in the figure, such as additional storage devices, communications devices, input devices and output devices, as illustrated by the ellipsis shown.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A system comprising an access card, the access card comprising:
    an interface;
    a memory; and
    a processor coupled to the interface and to the memory, wherein
        the processor is configured to:
            receive challenge data, according to an authentication protocol, via the interface of the access card, wherein
                the challenge data is received in lieu of a challenge,
                the challenge comprises one or more random numbers, and
                the challenge is processed to generate a response according to the authentication protocol,
            obtain key-management information from the challenge data, wherein the processor is configured to obtain the key-management information by extracting encrypted key-management information by processing the challenge data, and retrieving the key-management information by decrypting the encrypted key-management information, and store the key-management information in the memory of the access card.

2. The system of claim 1, wherein
the challenge data is comprised in a public key infrastructure (PKI) authentication request; and
the processor is configured to request a PKI authentication of a provider of the key-management information.

3. The system of claim 1, wherein the processor is configured to:
generate another response to the key-management information; and
transmit the another response in the form of a second challenge data to a provider of the key-management information.

4. The system of claim 1, wherein
the key-management information is encrypted within the challenge data.

5. The system of claim 1, wherein
the processor is further configured to generate another response based on the challenge data.

6. The system of claim 1, wherein
the authentication protocol is a secure socket layer (SSL) protocol that uses client certificate authentication,
the processing the challenge data comprises
using the client certificate authentication to perform the extracting of the encrypted key-management information.

7. The system of claim 1, wherein
the processor is further configured to
receive, according to the authentication protocol, the challenge, and
generate the response by decrypting, according to the authentication protocol, the challenge.

8. The system of claim 1, wherein
another key is encrypted within the challenge data,
the another key is used in a generation of an access request, and
the access request comprises a request for authentication.

9. The system of claim 1, wherein
the authentication protocol comprises a PKI protocol, and
the processing the challenge data comprises
using a cryptographic key according to the PKI protocol.

10. A method comprising:
receiving, by an access card, challenge data according to an authentication protocol, wherein
the receiving is performed via an interface,
the challenge data is received in lieu of a challenge,
the challenge comprises one or more random numbers, and
the challenge is processed to generate a response according to the authentication protocol;
obtaining, by the access card, key-management information from the challenge data,
wherein
the obtaining comprises
extracting encrypted key-management information by processing the challenge data, and
retrieving the key-management information by decrypting the encrypted key-management information; and
storing, by the access card, the key-management information in a memory of the access card.

11. The method of claim 10, wherein
the challenge data is comprised in a public key infrastructure (PKI) authentication request; and
the method further comprises
requesting a PKI authentication of a provider of the key-management information.

12. The method of claim 10, further comprising:
generating another response to the key-management information; and
transmitting the another response in the form of a second challenge data to a provider of the key-management information.

13. The method of claim 10, wherein
the key-management information is encrypted within the challenge data.

14. The method of claim 10, further comprising:
generating another response based on the challenge data.

15. The method of claim 10, wherein
the authentication protocol is a secure socket layer (SSL) protocol that uses client certificate authentication,
the processing the challenge data comprises
using the client certificate authentication to perform the extracting of the encrypted key-management information.

16. The method of claim 10, wherein
another key is encrypted within the challenge data,
the another key is used in a generation of an access request, and
the access request comprises a request for authentication.

17. The method of claim 10, wherein
the authentication protocol comprises a PKI protocol, and
the processing the challenge data comprises
using a cryptographic key according to the PKI protocol.

18. The method of claim 10, further comprising:
receiving, according to the authentication protocol, the challenge; and
generating a response by decrypting, according to the authentication protocol, the challenge.

19. The computer program product of claim 18, wherein
the challenge data is comprised in a public key infrastructure (PKI) authentication request; and
the plurality of instructions further comprise
a fourth set of instructions, executable on the computer system, configured to request a PKI authentication of a provider of the key-management information.

20. A computer program product comprising a non-transitory computer-readable medium storing:
a plurality of instructions, comprising:
a first set of instructions, executable on a computer system, configured to receive, by an access card, challenge data according to an authentication protocol, wherein
the challenge data is received in lieu of a challenge,
the challenge comprises one or more random numbers,
according to the authentication protocol, the challenge is processed to generate a response, and
the receiving is performed via an interface,
a second set of instructions, executable on the computer system, configured to obtain, by the access card, key-management information from the challenge data, wherein
the second set of instructions is further comprises instructions executable and configured to perform the obtaining the key-management information by extracting encrypted key-management information by processing the challenge data, and retrieving the key-management information by decrypting the encrypted key-management information; and a third set of instructions, executable on the computer system, configured to store, by the access card, key-management information in a memory of the access card.

21. The computer program product of claim 20, wherein the plurality of instructions further comprise:
a fourth set of instructions, executable on the computer system, configured to
generate another response to the key-management information, and
a fifth set of instructions, executable on the computer system, configured to
transmit the another response in the form of a second challenge data to a provider of the key-management information.

22. The computer program product of claim 20, wherein the key-management information is encrypted within the challenge data.

23. The computer program product of claim 20, wherein the plurality of instructions further comprise:
a fourth set of instructions, executable on the computer system, configured to generate another response based on the challenge data.

24. The computer program product of claim 20, wherein the authentication protocol is a secure socket layer (SSL) protocol that uses client certificate authentication, wherein the second set of instructions is further executable and configured to use the client certificate authentication to perform the extracting of the encrypted key-management information.

25. The computer program product of claim 20, wherein another key is encrypted within the challenge data,
the another key is used in a generation of an access request, and
the access request comprises a request for authentication.

26. The computer program product of claim 20, wherein the authentication protocol comprises a PKI protocol, and wherein
the processing the challenge data comprises
using a cryptographic key according to the PKI protocol.

27. The computer program product of claim 20, wherein the plurality of instructions further comprise:
a fourth set of instructions, executable on the computer system, configured to receive, according to the authentication protocol, the challenge, and
a fifth set of instructions, executable on the computer system, configured to generate the response by decrypting, according to the authentication protocol, the challenge.

28. An access card comprising:
an interface;
a memory; and
a processor coupled to the interface and to the memory, wherein
the processor is configured to
receive challenge data, according to an authentication protocol, via the interface, wherein
the challenge data is received in lieu of a challenge,
the challenge comprises one or more random numbers,
the challenge data comprises encrypted key-management information, and
the challenge is processed to generate a response according to the authentication protocol,
obtain key-management information from the challenge data, wherein
the processor is configured to obtain the key-management information by
retrieving the key-management information from the challenge data by decrypting the encrypted key-management information, and
store the key-management information in the memory of the access card.

29. The access card of claim 28, wherein
the challenge data is comprised in a public key infrastructure (PKI) authentication request; and
the processor is configured to request a PKI authentication of a provider of the key-management information.

30. The access card of claim 28, wherein the processor is further configured to:
generate another response to the key-management information; and
transmit the another response in the form of a second challenge data to a provider of the key-management information.

31. The access card of claim 28, wherein
the processor is further configured to generate another response based on the challenge data.

32. The access card of claim 28, wherein
the authentication protocol is a secure socket layer (SSL) protocol that uses client certificate authentication.

33. The access card of claim 28, wherein
the processor is further configured to
receive, according to the authentication protocol, the challenge, and
generate the response by decrypting, according to the authentication protocol, the challenge.

34. The access card of claim 28, wherein
another key is encrypted within the challenge data,
the another key is used in a generation of an access request, and
the access request comprises a request for authentication.

35. The access card of claim 28, wherein
the authentication protocol comprises a PKI protocol.

* * * * *